US010109173B2

(12) United States Patent
Keyton

(10) Patent No.: US 10,109,173 B2
(45) Date of Patent: Oct. 23, 2018

(54) PERSON OF INTEREST LOCATION CONFIRMATION SYSTEM

(71) Applicant: Kris Keyton, Fort Smith, AR (US)

(72) Inventor: Kris Keyton, Fort Smith, AR (US)

( * ) Notice: Subject to any disclaimer, the term of this patent is extended or adjusted under 35 U.S.C. 154(b) by 0 days.

(21) Appl. No.: 15/366,056

(22) Filed: Dec. 1, 2016

(65) Prior Publication Data

US 2017/0084150 A1 Mar. 23, 2017

Related U.S. Application Data

(63) Continuation-in-part of application No. 14/634,768, filed on Feb. 28, 2015.

(60) Provisional application No. 62/262,000, filed on Dec. 2, 2015, provisional application No. 62/296,777, filed on Feb. 18, 2016.

(51) Int. Cl.
| | |
|---|---|
| *G08B 23/00* | (2006.01) |
| *G08B 21/02* | (2006.01) |
| *H04L 29/08* | (2006.01) |
| *H04W 4/021* | (2018.01) |
| *G08B 21/22* | (2006.01) |

(52) U.S. Cl.
CPC ..... *G08B 21/0261* (2013.01); *G08B 21/0286* (2013.01); *G08B 21/22* (2013.01); *H04L 67/10* (2013.01); *H04W 4/021* (2013.01)

(58) Field of Classification Search
CPC .................................................... G08B 21/22
USPC .......................................... 340/539.13, 573.4
See application file for complete search history.

(56) References Cited

U.S. PATENT DOCUMENTS

| | | | | | |
|---|---|---|---|---|---|
| 5,471,197 | A | * | 11/1995 | McCurdy | G08B 21/22 340/539.1 |
| 6,236,319 | B1 | * | 5/2001 | Pitzer | B63C 9/0005 340/572.8 |
| 6,639,516 | B1 | * | 10/2003 | Copley | G08B 21/0283 340/426.17 |
| 8,493,219 | B2 | * | 7/2013 | Buck | G08B 21/0261 340/539.13 |
| 8,736,447 | B2 | * | 5/2014 | Ehrman | G08B 21/0492 340/286.07 |
| 9,064,391 | B2 | * | 6/2015 | Vardi | G08B 13/1463 |
| 9,141,087 | B2 | * | 9/2015 | Brown | G04F 10/00 |
| 9,460,612 | B2 | * | 10/2016 | Vardi | G08B 29/046 |
| 2005/0116811 | A1 | * | 6/2005 | Eros | G07C 9/00087 340/5.82 |
| 2008/0220871 | A1 | * | 9/2008 | Asher | G07F 17/32 463/42 |

\* cited by examiner

*Primary Examiner* — Eric M Blount
(74) *Attorney, Agent, or Firm* — Braxton Perrone, PLLC

(57) ABSTRACT

A location confirmation platform of a released arrestee's location and a property entry status system for establishing a virtual boundary around a property in which an individual is scheduled or authorized to appear or occupy and polling and confirming the individual's presence within the boundary.

19 Claims, 14 Drawing Sheets

PERSON OF INTEREST LOCATION CONFIRMATION SYSTEM

PRIORITY

This application is a continuation-in-part application of co-pending U.S. patent application Ser. No. 14/634,768 filed Feb. 28, 2015, the entirety of which is hereby incorporated by reference. This application claims priority to U.S. Patent Provisional Application No. 62/262,000 filed Dec. 2, 2015, the entirety of which is hereby incorporated by reference. This application is also claims priority to U.S. Patent Provisional Application No. 62/296,777 filed Feb. 18, 2016, the entirety of which is hereby incorporated by reference.

TECHNICAL FIELD

This disclosure relates generally to a system and methods for confirming the location of an incarcerated individual's location through use of a wireless device and a previously designated boundary established through a geo-fencing capability. An individual receives a requests to confirm a location and the individual's response to the request indicates whether the individual is present within the previously designated boundary. The disclosure relates further to system and methods for ascertaining the location of an individual released from custody on bail at the time the individual is due to appear in court or before another tribunal or agency in order to protect the security posted for the release of the individual. The disclosure also relates to systems and methods for ascertaining the location of undocumented or unlicensed individuals operating motor vehicles.

DESCRIPTION OF RELATED ART

The criminal justice system and local, state and federal departments of corrections need to regularly confirm the whereabouts of incarcerated individuals confined to both detention facilities and outside of detention facilities, such as those confined to house arrest. Many departments of corrections employ technology incorporating global positioning technology (GPS) to monitor the location of the individual wearing the device in which the GPS capability resides. Most commonly, those under house arrest wear a GPS enabled bracelet that is affixed to the ankle. This allows corrections personnel to track the incarcerated individual's location. The problem with traditional location tracking devices is that they can be bypassed or fooled and the large volume of those under house arrest makes the task of tracking each in an efficient way problematic. There is, therefore, a need for efficiently and accurately tracking and confirming the location of an individual under home incarceration.

Similarly, those charged with crimes are often released on bail of some amount set by the court. An individual charged with a crime is released to prevent overcrowding of detention facilities when the individual is found by the court as a low risk of harm to the community and of flight from justice. When bail in some amount is posted, an individual charged with a crime must either deposit the funds with the clerk of the court of obtain a third party to do so. These third parties, known as bail bondsmen, post a bond representing a percentage of the amount of bail set by the court. The bond serves as a pledge to secure the charged individual's appearance at future court proceedings. In the event the accused does not appear as scheduled, the party posting the bond must satisfy the pledge. It is important to the bail bondsman that the accused individual appears in court as required to avoid financial loss. Thus, there is a need to ascertain in real time the location of an individual released on bond at or close to the time when that individual is scheduled to appear in court to protect the investment of the party posting bail.

In the real estate business, individuals wishing to place real property for sale typically list the property for sale with a multiple listing service (MLS). Once a property is listed on the MLS, realtors may view properties for sale and provide such properties for inspection by potentially interested buyers. Properties listed on MLS are made known to the public via various Internet web sites, mobile applications, print advertising, signage placed on the property indicating that it is for sale, and the like. A listed property typically has a device placed on or near the main entrance of the property in which a key or other means for providing access to the property is secured. The purpose of these devices is to allow realtors to present properties for sale to poetential buyers when the property owner is not at home to allow access to the property. Various types of these devices are known. One such device is a manual or digital locked device in which a multi-digit number must be entered, either by depressing numbers on a digital keypad or positioning numbers on a combination style lock in order to gain access to a key or other code or device to gain entry into the property. At times, a realtor is provided with combination or code for this device. For some devices, the device recognizes a code assigned to a registered realtor that a realtor may use to gain access to multiple properties. Other devices may have a card reader that reads a code embedded on a magnetic strip or chip embedded within a card assigned to a realtor to provide the realtor access to one or more properties.

The drawback of these types of access systems is that those not authorized as realtors or otherwise to gain access to a property through these access devices may obtain the codes, cards or number combinations and enter a property. Once inside the unauthorized entrant may steal or damage personal property, occupy the property without consent or harm individuals within the property, including the realtor. Also, there is the possibility that a realtor is forced to enter a property with a third person who intends to either do harm to the realtor, the property or others occupying the property. Thus, there is a need to provide enhanced security in terms of allowing access to property for sale and ascertaining entry of a property for sale by a realtor or others and identifying if there is a risk of criminal activity associated with a viewing of a home by a realtor or otherwise The system and methods described herein also address the need to identify unlicensed drivers operating a motor vehicle. Currently, if a police officer has cause to make a traffic stop based on a moving violation, equipment defect or otherwise, then the officer may at that time ascertain whether the driver of the vehicle is a licensed driver. Otherwise, the officer has no way to ascertain whether drivers are actually licensed. The systems and methods disclosed herein address this problem by providing remote capability to determine the presence of an unlicensed vehicle operator.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DESCRIPTION OF THE EMBODIMENTS

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

In one embodiment of the presently disclosed house arrest confirmation system, information concerning an incarcerated individual are stored in one or more databases associated with a department of corrections server. A department of corrections server may be accessed by municipal authorities including members of the court system, law enforcement personnel, probation officers and the like. In addition, third parties such as bail bondsmen may access or maintain such a server to ascertain the location of an individual. The incarcerated individual information stored in the database(s) includes the individual's name, age, gender, offense, period of incarceration, address of home confinement location, photographs and other biometric identification data, such as digital images of the individual's fingerprints, facial photographs, voice characteristics and the like. In a scheduling database associated with the department of corrections server, information such as the global positioning coordinates of the location of home confinement and the schedule by which the individual's location is to be confirmed is also stored. In some instances, the individual may be confined to only home confinement, meaning the individual may leave the home under no circumstances, unless express permission by corrections personnel is received. For other individuals, confinement within the home may be limited to certain times of day, while during other times of day the individual may travel to work, deliver children to school, care for family members, receive regularly scheduled medical treatment or counseling, or the like. In these situations where the individual is expected to arrive and stay at various locations at pre-established times of day or pre-established days, the scheduling database includes schedule and location data that reflects where the individual is expected to be at what time of day. In particular, the scheduling database will reflect that a particular individual should be located in the home during a established time duration and, by example, at a place of employment on certain days between certain hours. In this manner, the confirmation process that will be described below can function within these pre-defined scheduling parameters.

The individual data may be stored in a detainee database maintained by correction authorities and may include biometric identification data of an individual. This includes fingerprint data and a digital representation of an image of the individual's face. This information is used in the individual location confirmation process described below.

Figure 1:
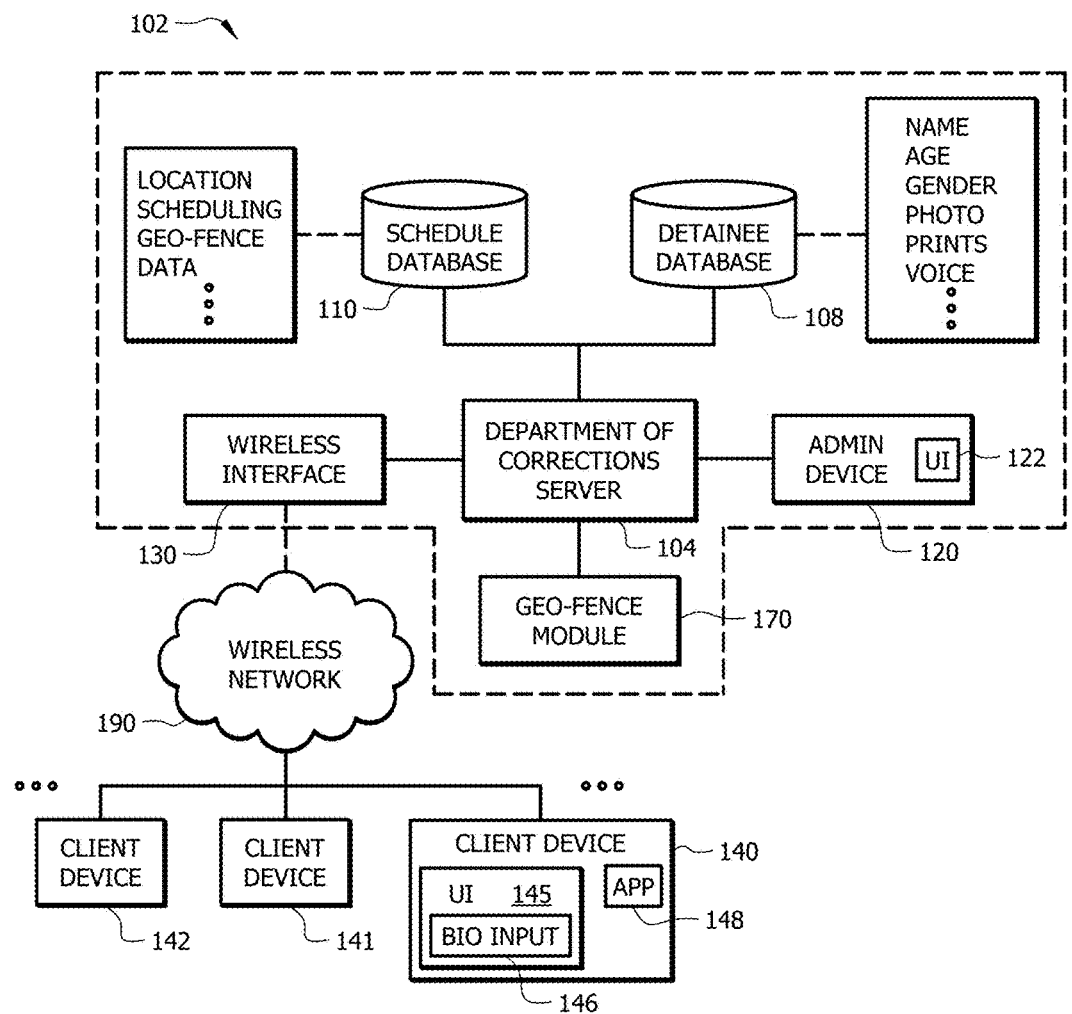
FIG. 1 is a block diagram of an embodiment of the present home incarceration confirmation system.

The system embodying the structure and functional elements of the presently described invention is depicted in FIG. 1. In FIG. 1, location confirmation platform 102 includes a department of corrections server 104 including a processor 106 and associated databases including detainee database 108, which includes individual detainee data and scheduling database 110 including scheduling data for the particular detainee. Detainee database 108 includes data fields associated with an individual detainee, as described above. Scheduling database 110 includes an address or addresses at which a detainee is expected various times during the day. Among the data stored in scheduling database is data representing the address at which the detainee resides or is to be held during the house arrest period. The data base may also include precise latitude and longitude coordinate data representing this address. Other addresses of locations where the detainee is permitted to be during various times of the day, week or month are also included in scheduling database. Location confirmation platform 102 may reside remotely from client device 140 or may be a local control unit that resides locally to client device 140. Location confirmation platform may communicate with client device 140 via known wired or wireless protocols such as WiFi, Bluetooth or other protocols.

An administrator device 120, which may be a desktop computer, portable device, smart phone, tablet or the like, includes a user interface 122. Through this interface, a corrections department administrator or authorized vendor may set or modify parameters associated with the house arrest confirmation system 100. By example, if a detainee is required to visit a counselor from 3 p.m. to 4 p.m. local time each Thursday, the schedule database 110 may be updated accordingly with a regularly set time and date of the counseling session as well as the address of the counseling session. The detainee database may also be updated to include the counselor's name as well as a document reflecting authorization for such sessions. Similarly, through administrator device 120, an administrator can monitor confirmation reports on all or a select group of detainees according to set filtering criteria.

Department of corrections server 104 communicates with a wireless network interface 130 to communicate over wireless network 190. Over wireless network 190, the location confirmation platform 102 may communicate with a variety of client devices 140, 141 and 142 associated with each detainee. Each client device 140, 141, and 142 includes a user interface 145 as well as a biometric data input device 146. In one embodiment, the client device is a smart phone, such as an Apple iPhone. The biometric data input device 146 of a device such as the iPhone may be the camera capability of the iPhone. In this manner, a photograph of the face of the detainee is the biometric data that is recorded and transmitted to the location confirmation platform 102. In addition or in the alternative, the client device 140 may include a fingerprint sensor such as that provided in the iPhone via its Touch ID capability. Other smartphones include a camera and fingerprint sensor capability through which transactions may be executed with the phone. Software residing in mobile devices in conjunction with voice recording capability, such as an internal microphone or an external or detachable microphone, enable recording of an individual's voice and creation of a digital representation of the voice that may be stored in the detainee database for later use in connection with the location confirmation platform. An application program 148 is installed, either temporarily or permanently on client device 140. Application program 148 facilitates communication with location confirmation platform 102 and an internal wireless interface of client device 140 allows communication with other systems and devices, including location confirmation platform 102 according to various wireless or cellular network protocols.

In one embodiment client device 140 is a combination of a monitoring band and smart phone. The monitoring band is worn by the incarcerated individual around the wrist, ankle or other body part. The band operates in conjunction with a mobile device such as a smart phone equipped with an application for monitoring the location of the monitoring band in terms of its proximity to the smart phone. This is achieved in one embodiment through a control unit to which the monitoring band communicates via a wireless, short range protocol such as Bluetooth. The monitoring band includes wire of fiber optic circuitry and a closure device such as a clasp similar to that found on a watch. Once the clasp is connected to affix the monitoring band on to the incarcerated individual, the circuit of the monitoring band is completed and the associated control unit monitoring of the location of the monitoring band is invoked. The monitoring band clasp is of a non-removable design, meaning it is damaged upon removal. Of course, upon the breaking of the clasp to remove the device, the circuit is open and the control unit will detect this breach accordingly. In operation, the control unit is in communication with the monitoring band via a Bluetooth low energy transmitted and the control unit monitors the integrity of the band. In turn, the control unit communicates with the smart phone and the smart phone performs the operations of the client device 140 as described below through execution of an application installed on the smart phone. In operation, the monitoring band and smart phone will work in unison, with either the monitoring band or smart phone vibrating when a check-in or confirmation request is received from the location confirmation platform 102.

In other embodiments, the functionality of client device 140 may be incorporated into a wearable device.

In association with server 104 is geo-fencing module 170. Various geo-fencing invocation techniques are known. In one embodiment the geo-fence acts as an electronic jail cell. In one embodiment, geo-fencing module 170 establishes individual geo-fence boundaries according to the particular locations associated with a detainee according to data stored in schedule database 110. By example, based on a detainee's home address, a geo-fence setting a boundary around a dwelling at that location may be established. More particularly, local tax records could be used to specifically plot a boundary or for multi-unit dwellings plot a boundary of the individual's particular dwelling unit and surrounding areas such as common areas, back yards and the like. The geo-fencing module 170 creates the boundary or an approximation of the actual property boundary based on known real estate information. The boundary so created is stored in the scheduling database 110 and is associated with the individual detainee.

In the alternative, installed on the detainee's client device 140 is an application program 148 having instructions executed by the processor of device 140. Through this program, a geo-fence boundary is established in proximity to the place of confinement of the detainee. Depending on the size of the dwelling, a boundary of an approximate radius about a center point of the dwelling may be established. In this embodiment, the client's device 140 communicates with the geo-fencing module 170 to locate the device via GPS to designate the geo-fence. This boundary thus created is stored in the scheduling database 110 and is associated with the individual detainee. As additional locations and associated geo-fence boundaries are created for a particular individual based on authorized locations that a detainee may visit, boundaries for these locations are created.

Figure 2:
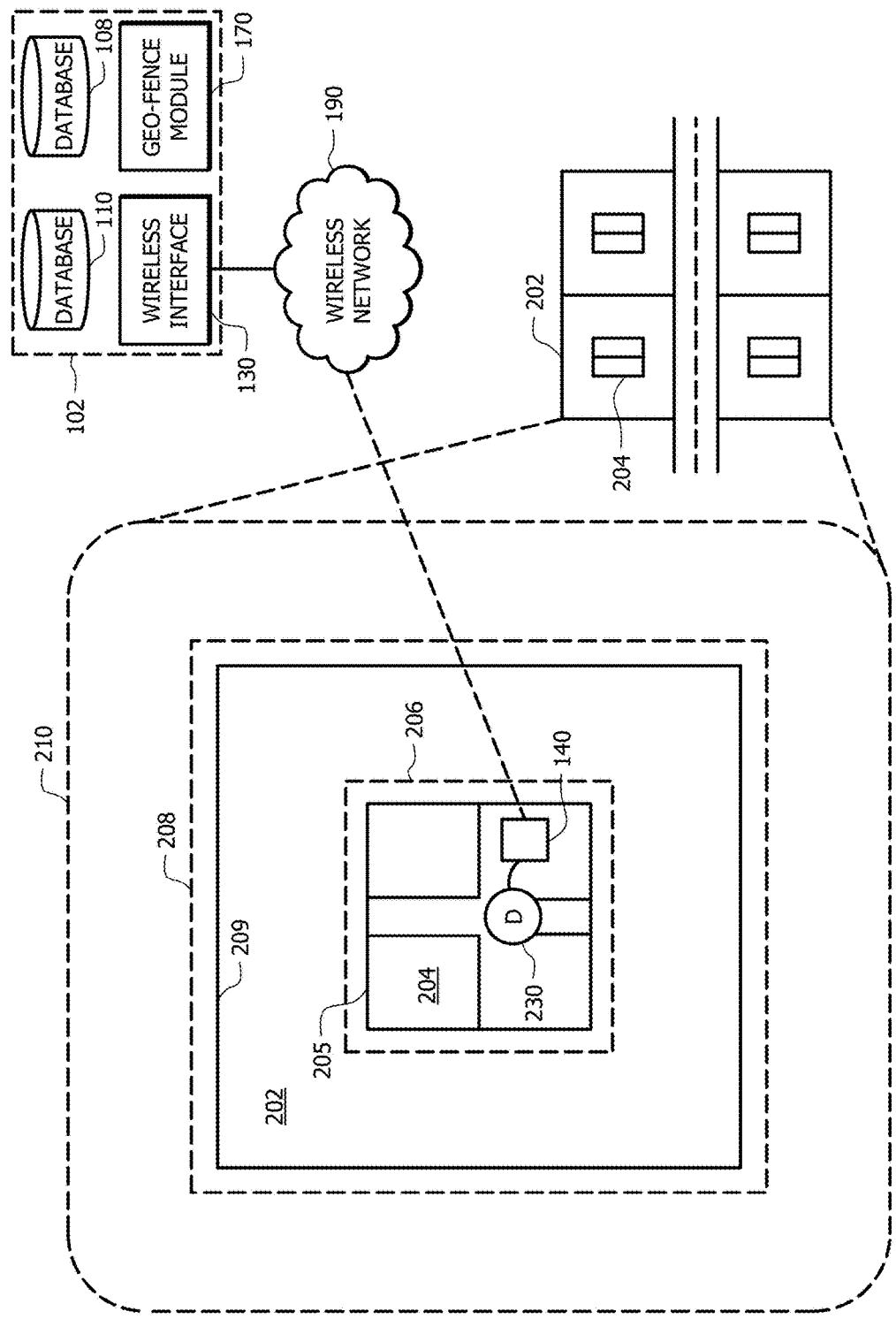
FIG. 2 is a diagram of a setting in which an embodiment of the present home incarceration confirmation system may be deployed.

The initial setting of the geo-fence at the place of incarceration may occur in a variety of ways. A department of corrections official using client device 140 on which a geo-fence enabling application is installed may establish the boundaries of the geo-fence. FIG. 2 depicts a dwelling, the boundary of which will be enrolled in the present location confirmation system. In FIG. 2, location confirmation platform 102 includes geo-fencing module 170 and has associated detainee database 108 and schedule database 110. Location confirmation platform 102 communicates through a wireless interface 130 that facilitates communication over a wireless network 190 to at least one client device 140.

In FIG. 2, neighboring properties are shown along either side of a street. Assume property 202 is a property on which dwelling 204 sits. Dwelling 204 is a property of interest if that is the location of confinement of a particular detainee who is a client of the present home incarceration confirmation system. An expanded view of property 202 is provided in FIG. 2. Within dwelling 204 is detainee 230 having client device 140. Client device 140 includes an executable application for performing various functions associated with the present home incarceration confirmation system, including user interfaces for entering location data, biometric data and sending and receive messages including text, data and the like. The outer perimeter 205 of dwelling 204 is co-extensive with exterior walls of dwelling 204. Similarly, the entire property of interest 202 includes dwelling 204 and a yard area surrounding dwelling 204. The outer perimeter 209 of property 202 is co-extensive with the property line or an exterior physical fence surrounding property 202.

Client device 140 in communication with geo-fencing module 170 enables creation of the geo-fence boundary for dwelling 204 and property 202. As shown, a virtual dwelling boundary 206 surrounds dwelling 204 and a virtual property boundary 208 surrounds property 204. Detainee or department of corrections official 230 is situated within dwelling 204. In addition, an extensive virtual boundary 210 that extends beyond the real outer perimeter 209 of property 202 may also be created if a detainee may be permitted to traverse the real property line in some limited fashion.

Figure 3:
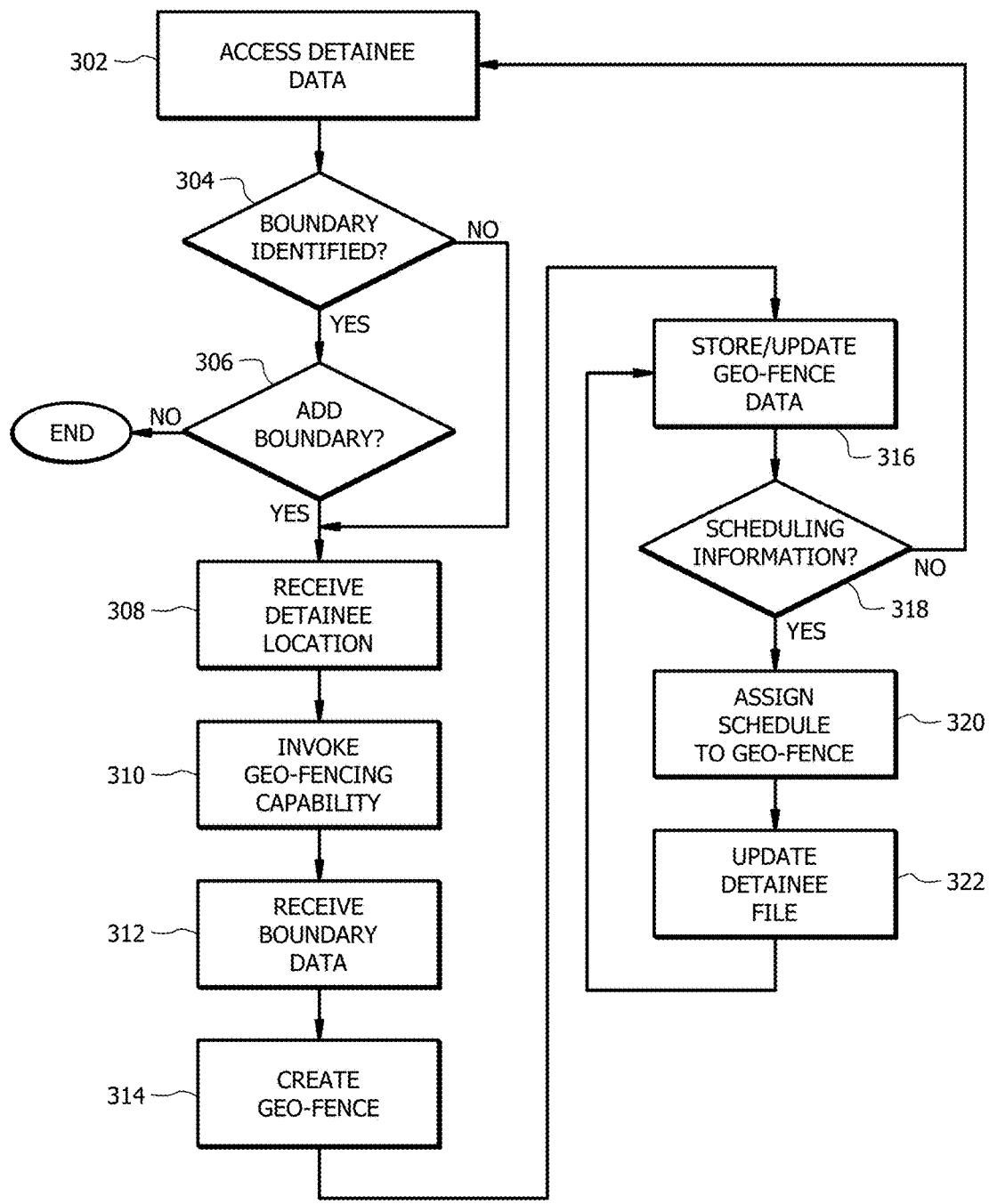
FIG. 3 is a flow diagram of a process of establishing virtual boundaries according to an embodiment of the present home incarceration confirmation system.

The virtual boundaries described above may be created in a number of ways. FIG. 3 is a flowchart describing various steps performed by the location confirmation platform 102 and/or the associated geo-fence module 170 to create the virtual property boundary 208 or virtual dwelling boundary 206. An embodiment of the process depicted in FIG. 3 may be performed by execution of programmable instructions residing at least in the department of corrections server 104, geo-fencing module 170, one or more client devices 140 and an intermediate software module in association with the location confirmation platform 102 via various network media, such as a wireless or cellular network, and in accordance with various know communication protocols.

In FIG. 3, at step 302, the data file of an individual detainee is accessed from the detainee database 208. At this juncture, the detainee may be an individual previously enrolled in the house incarceration confirmation system or a new enrollee. Once a record of a detainee is retrieved, the process continues to decision point 304 where it is determined whether any boundary data for this detainee has been established. It is contemplated that the detainee file will include a designation indicative of whether or not the schedule database includes boundary data for this detainee. In the alternative, the detainee file may include a link to a boundary data file for this detainee if one exists. By activating the link, the user interface at administrator device 120 may be presented with a visual representation of the detainee's place of home incarceration as well as the extent of a pre-existing virtual boundary. If the detainee is permitted to visit places outside of the home, such as a place of employment of for medical treatment, links to those locations are presented to the administrator as well.

If at decision point 304 it is determined that no boundary has been identified for an detainee, the process proceeds to step 308. On the other hand, if at decision point 304 it is determined that there is at least one boundary identified for a detainee, the process continues to decision point 306, where it is determined whether another boundary must be associated with the detainee. If no additional boundary designation is necessary, the process ends at step 307. If, on the other hand, an additional boundary designation is needed, the process proceeds to step 308.

At step 308, the geo-fence module 170 receives detainee location data. Once detainee location data is received, the geo-fencing capability of the location confirmation platform 102 is invoked as step 310. The geo-fence module receives real boundary data associated with the property or dwelling to which the detainee may be restricted at step 312 and the geo-fence or virtual boundary is created at step 314 and stored at step 316.

The virtual boundary creation associated with the detainee's place of confinement described with reference to the steps above may be executed in a variety of ways. Detainee location data may be received or retrieved by the geo-fence module in a number of ways. In one embodiment, the virtual boundaries may be created in predesignated a pre-determined manner based on property data residing in a database associated with the geo-fence module 170 of location confirmation platform 102, which may be the schedule database 110, detainee database 108 or other database. Pre-designated data may be property survey information made available through state or local agencies that reflect actual dimensions of a dwelling or property as a whole. To invoke boundary creation in this manner, the location confirmation platform 102, via wireless network 190, calls or pings client device 140 to ascertain its location. When the client device 140 "answers" this call by, for example, the official activating a key on the user interface of the client device 140, the location or coordinates of client device 140 are established using a GPS locate capability that is executed through software residing in the geo-fencing module. Once this location is ascertained, the parameters of the boundary may be invoked by the geo-fencing module in a variety of ways. In one embodiment, the actual footprint of the dwelling 204 and/or property 202 gleaned from property tax or real estate records may be used to create a virtual dwelling boundary 205 or virtual property boundary 208. The resulting boundary geographically reflects the actual footprint of the dwelling or property and is stored in scheduling database 110.

In an alternative embodiment, the location of the client device called is established as described above. Next the boundary of the dwelling or property is created based on data concerning the property previously stored in a database associated with the geo-fence module. This information may be gleaned from survey information made available my state or local taxing authorities or county real estate records. Based on this information, the square footage of the dwelling or property may be ascertained. Once the dimension of the property or dwelling are known, the geo-fence module 170, via software associated with the module, may establish a virtual property boundary 208 about property 202 and/or virtual dwelling boundary 205 about dwelling 204 according to the approximate dimensions of the property or dwelling. That is, the boundary may not precisely co-extend to the real boundary of the dwelling 204 or property 202, but an approximation of the boundary is created based on the real dwelling or property size. Once created, the virtual property boundary 208 and/or virtual dwelling boundary 205 are stored in a database associated with the location confirmation platform 102.

In addition, an extensive virtual boundary 210 may be created in a similar manner that extends beyond the real property boundary 209 or real dwelling boundary 205 in the event that the detainee is to be given some leeway in terms of the area he or she may traverse. By example, the geo-fence module may add a percentage to the overall square footage of the property and establish a virtual property boundary 208 or virtual dwelling boundary 206 that extends beyond the actual boundaries by some distance or percentage that is acceptable under the circumstances to department of corrections officials.

In another embodiment, the virtual boundary may be established by leveraging satellite imagery and online maps identifying a dwelling or property, such as that typically available online through websites such as Google Maps. Through such websites, and through software residing on or in connection with the geo-fence module 170, the location of client device 140 may be plotted and the virtual boundary of the dwelling or property may be approximated based on the size and scale of the online map.

In another embodiment, the virtual boundary may be established by plotting property boundary points with the client device and transmitting the boundary point data to the geo-fence module 170, and leveraging GPS functionality within the device 140 and the geo-fence module 170 to create a virtual boundary based on the exterior points of the property 202 or dwelling 204. In one embodiment, the user interface of client device 140 may provide an activation key that is depressed to plot a point on the property or located outside or in close proximity to the dwelling.

In another embodiment of the location confirmation platform 102, the detainee's location is tracked in real time using GPS data once the detainee leaves the place of confinement. Using known GPS techniques residing in a client device, corrections officials are able to accurately monitor the movements and location of a detainee. Location data may be stored in a local device affixed or worn by the detainee and the data is reported to confirmation platform 102 where it is stored and compared data concerning the detainee's expected whereabouts at a particular time period.

Returning to FIG. 3, following storage of geo-fence data resulting from the creation of a boundary at step 316, the process continues to decision point 318 where it is determined whether any particular scheduling information associated with the detainee is relevant for purposes of the location confirmation system. In embodiment, the default rule is that once a boundary is set for a detainee is expected to be located within that boundary twenty-four hours per day. If there is no scheduling information associated with this detainee, then the process proceeds to back to step 302 and the file of another detainee may be examined or updated. If, on the other hand, some scheduling circumstance for a particular detainee is determined at step 318, then the process proceeds to step 320 where scheduling information is assigned to a virtual boundary or geo-fence previously set for the detainee. Assuming two geo-fences have been set for a detainee, the first being the detainee's dwelling and the second being the detainee's place of employment, then each geo-fence will have associated with it the hours of the day during which the detainee is expected to be at each location. For example, if the detainee works from 9:00 a.m. to 1:00 p.m. on Monday and Wednesday, these time spans will be associated with the geo-fence for the detainee's place of employment. The remaining hours of the week will be associated, by default, with the detainee's dwelling, which is the primary location of incarceration. At step 322, the detainee's record is updated to reflect that the scheduling change was made, and the process returns to step 302 where another detainee's data may be accessed. In this manner, when a detainee is polled to determine location, the location confirmation platform 102 will not generate false alerts due to the detainee's absence from his primary dwelling although he is at his work location at an authorized time.

Once a detainee is enrolled in the present house incarceration confirmation system the individual's personal data is stored in a detainee database, schedule data reflecting any other locations where the detainee is authorized to visit and geo-fence or virtual boundaries have been established for a particular detainee, the present house incarceration confirmation system operates to monitor the status of the detainee. The data obtained by the detainee at the time of enrollment includes biometric data that is stored in the detainee database and/or scheduling database and is used to confirm confirmation communications that will be discussed. Biometric data is information pertaining to an individual's characteristics, such as a fingerprint, facial features or voice patterns. The location confirmation system 102 employs fingerprint or thumbprint recognition technologies, and facial and voice recognition technologies as tools in conjunction with GPS tracking capabilities to confirm detainee confirmation messages, as described below.

Figure 4:
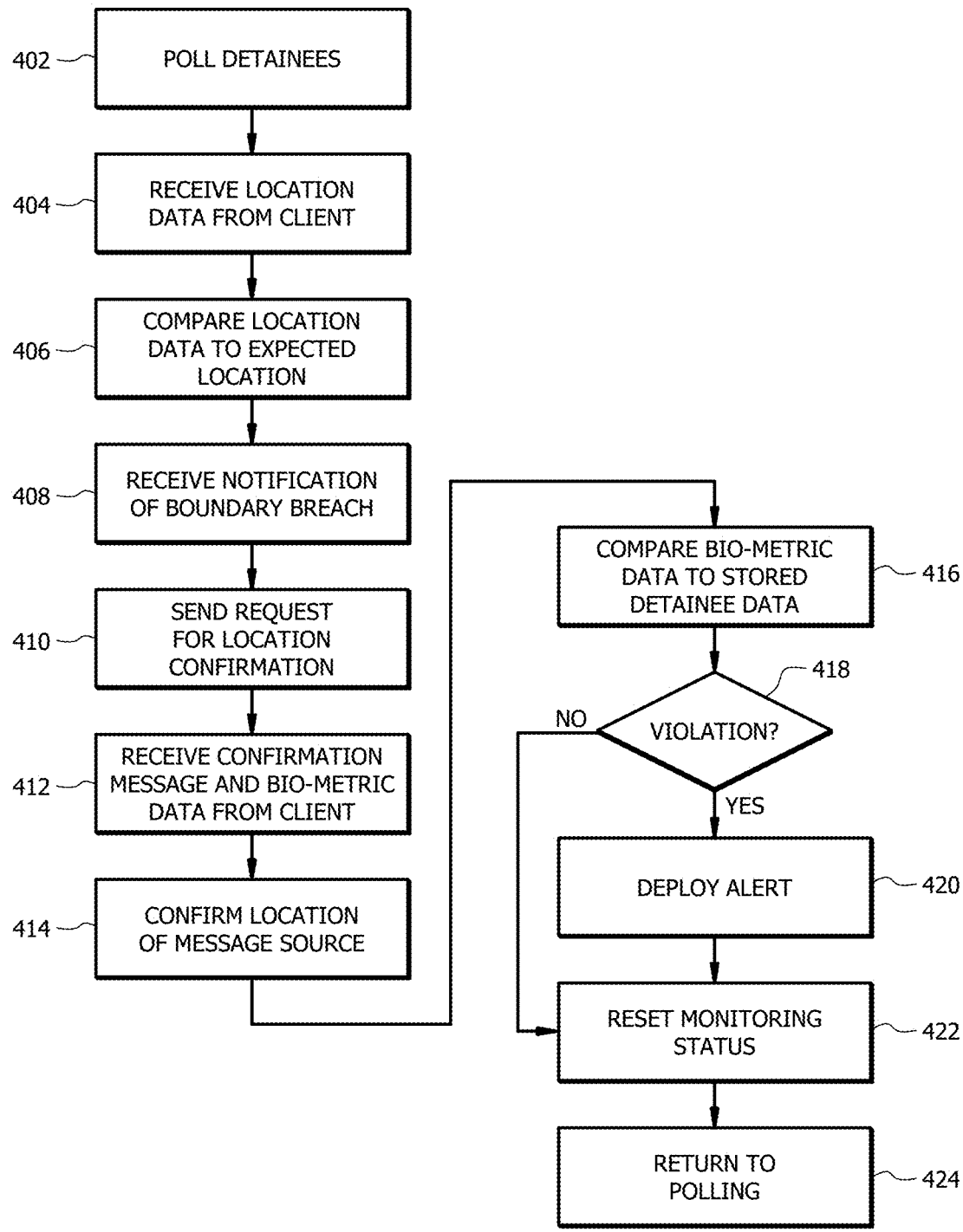
FIG. 4 is a flow diagram of a process of confirming the location and identity of a client according to the present home incarceration confirmation system.

FIG. 4 is a flowchart depicting an embodiment of a process executed by the present home incarceration confirmation system. The steps and processes depicted in FIG. 4 may be performed by execution of programmable instructions residing at least in part in the department of corrections server 104, geo-fencing module 170, one or more client devices 140 and/or an intermediate software module in association with the location confirmation platform 102 via various network media, such as a wireless or cellular network, and in accordance with various know communication protocols.

The present house incarceration confirmation system is designed to provide real-time monitoring of detainees through hardware and software that will promote accurate and fraud resistant accounting of detainee whereabouts. The system will make house detention safer and more effective alternative to institutional confinement, which suffers from overcrowding and high cost. The process of the embodiment described in FIG. 4 provides an efficient location confirmation system. In general, based on the GPS capabilities of the present house incarceration confirmation system, the location of a detainee may be ascertained simply by locating the client device 140 and confirming that the location of the client device 140 is at the expected location. If this practice alone proves faulty because of its susceptibility to fraud, then the client device operating in conjunction with an established geo-fence or virtual boundary for a detainee provide an alert when a detainee departs from the expected place of confinement. In this manner the system operates much like an RFID tag and sensor that activates an alarm when an item on which the tag is affixed traverses an RFID reader.

The union of a client device 140 and the geo-fence alone may not be sufficient, however, as known devices such as ankle bracelets may be manipulated so as to not be detected when crossing a particular boundary. Alternatively, a smart phone operating as the client device 140 provides sophisticated GPS capabilities and other applications that will assist corrections personnel in monitoring a detainee's status. Yet the smart phone alone does not alleviate all of the fraud concerns as the detainee may simply leave the device behind and leave the place of confinement. An application, however, that may be downloaded to a smart phone that facilitates communication with the location confirmation platform 102 via a wireless protocol eliminates these shortcomings by providing an effective and virtually fraud resistant communications link through which corrections officials may monitor the detainee's location and at desired intervals or at random times confirm the detainee's location.

The process of FIG. 4 begins with step 402 in which in which a detainee or group of detainees are polled. In operation, the operator of the confirmation system will ping the device of the incarcerated individual to ascertain location information and invoke the location confirmation process. This may be achieved in a variety of ways. For example, some detainees may be assigned a status that invokes a frequent polling requirement. This status is associated with the detainee and made part of the detainee data stored in detainee database 208 and scheduling database 210. All such designated detainees may be polled together. In this context, at the time at which polling is to occur, the location confirmation system 102 pings or calls the designated client device 140 to receive its location data. Assuming the client device 140 is a smart phone, then the device 140 is likely within the boundary of the required place of confinement when polled. When location data is received, location confirmation system 102 compares the location of the phone to the expected location and the interior of the boundary area. If the device location is outside of the area in which the device is expected, location confirmation system 102 generates an alert at step 408. Next, at step 410, location confirmation system 102 automatically in response to the alert or an administrator from administrator device 120 sends an individual request over, for example, a wireless or cellular network, to the detainee's client device 140 requesting that the detainee's location be confirmed.

At this juncture, the detainee receives the individualized request to confirm the location of the detainee. In an embodiment of the present home incarceration confirmation system, the detainee must send a confirmation message back to the location confirmation system 102 that includes indicia of authenticity. Such indicia is in the form of biometric data unique to the detainee. The biometric identification information may be in the form of a digital representation of finger or thumbprint, a digital profile of a detainee's facial features or a digital representation of the detainee's voice when reciting a particular word or phrase. The location confirmation system 102 uses previously collected biometric identification information and compares it to currently receive biometric information to determine the legitimacy of the detainee's confirmation message and location.

Continuing with FIG. 4, the process proceeds to step 412, where in response to the request sent to the client device, location confirmation system 102 receives a confirmation message from client device 140. This message includes one or more forms of biometric identification data input by the detainee at the time the request was sent. In one embodiment, the client device 140 may be equipped with a thumbprint sensor much like that equipped on the Apple iPhone 6 or other smart phones. In operation, the application residing on the device requires that the confirmation sent in response to the confirmation request of the location confirmation system 102 be sent while the detainee's thumbprint is sensed by the sensor. Such sensor technologies measure the contours of an individual's thumbprint and create a digital representation of it that reflects measurements of the features of the thumbprint according to an application program residing in the device. Since in theory no two finger or thumbprints are alike, the digital representation of the detainee's thumbprint will be virtually unique to that detainee.

In addition, location confirmation system 102 administrators may require additional biometric information from the detainee in the event an alert notification is received. If device 140 is equipped with a camera or microphone, the location confirmation system 102 instruction of application residing on client device 140 will be invoked that will cause the detainee to take a full face photograph of himself and record his own voice reciting a word or phrase that is the same word of phrase recorded of the detainee at the time of enrollment. Once the detainee's facial photograph is taken and/or voice recording is made, the detainee will send the identification items to location confirmation system 102 while the detainee's thumb is placed on the sensor key or pad of the client device. As a result of this operation or series of operations, location confirmation system 102 will receive multiple pieces of information from the detainee that may be used to confirm the detainee's location. Location confirmation system 102 will receive location data of client device 140 corresponding to the location of the device when the confirmation message was sent. In addition, location confirmation system 102 will receive a photograph of the face of the detainee as well as a voice recording of the detainee reciting the previously recorded word or phrase. Location confirmation system 102 will also receive a digital profile of the detainee's thumbprint, along with a time stamp associated with the creation and transmission time of all identification items.

The significance of transmission of the digital profile of the detainee's thumbprint is that the confirmation message could not have been sent if the detainee was separated from client device 140 or by someone other than detainee because of the uniqueness of the thumbprint.

Once this confirmation message and data is received by location confirmation system 102 at step 412, location confirmation system 102 first confirms the location of client device at step 414. The inquiry at this juncture is whether the confirmation information received by the detainee reflects a location that is one where the detainee is authorized at that time. This determination may be made in a number of ways, and in one embodiment by plotting the location at the time of message transmission by the detainee and determining if that location falls within a pre-established geo-fence for this detainee. If the source location is a location that is an authorized location, location confirmation system 102 proceeds to confirm the authenticity of the message by confirming that the sender was in fact the detainee. This is accomplished by comparing the newly received identification data, which may be one or all of the detainee's purported thumbprint, facial photograph and voice recording to previously recorded or retrieved items that are stored in one of the databases associated with location confirmation system 102. Software residing on or in association with location confirmation system 102 embodying voice and facial recognition techniques compares the received voice and facial data to pre-existing detainee files and determines if the two sets of data match. The digital profile of the thumbprint is also compared to a previously obtained thumbprint or thumbprint profile and similar software residing on or in association with location confirmation system 102 performs a comparison.

Once the comparison of step 416 is complete, the process of FIG. 4 proceeds to decision point 418, when it is determined if the detainee is confirmed as the sender of the confirmation message and the confirmation message was sent from the expected, authorized location. If the detainee is confirmed as the sender of the confirmation message and the message was sent from an authorized location, there is no apparent violation and the process proceeds to step 422, discussed below.

On the other hand, if at decision point 418 either the detainee cannot be confirmed as the sender of the confirmation message or the location from which the message was sent is not an authorized location, at step 420 location confirmation system 102 deploys corrections personnel to locate the detainee and/or client device and an alert that detainee is in breach of his home confinement terms is dispatched. Next the process continues with step 422, where the detainee's monitoring status may be reset or updated to reflect these events. For example, if the detainee's response and whereabouts are confirmed as acceptable, corrections administrator's may wish to flag this detainee for heightened, more frequent, or random monitoring and the detainee's file and corresponding scheduling data may be updated accordingly. In the event of a breach, the detainee's and scheduling files may be similarly updated, provided home incarceration is still an option.

The confirmation process described above was, in one embodiment, invoked by virtue of regular location data received by the phone through general GPS data collection and identification techniques. The confirmation process performed by the present home incarceration confirmation system may, however, also be invoked when a detainee simply leaves an authorized location and crosses the corresponding virtual boundary created by the geo-fence module 170. Once the detainee crosses the boundary and the GPS tracking capability in the client device 140 and location confirmation system 102 senses the breach, then correction officials may similarly engage in the confirmation process described by reference to FIG. 4 to attempt to confirm the detainee's location and correct a possible false alarm prior to deploying police or corrections personnel to the place of confinement and initiating a search for the detainee.

The location confirmation described above may be modified to provide location information of a charged or convicted individual either during a house arrest period or after serving a sentence where the charge or convicted individual is prohibited from coming within a certain proximity to the home or workplace of the victim of the subject crime as a condition of the sentence or release. In one embodiment, the databases of the present location confirmation system may include identification information of the victim of the crime for which the subject individual was charged. This information may include the name of the victim of equivalent unique identifier, along with the address of the home, place of employment or other locations regularly attended by the victim. These locations will be geo-fenced as described above and files corresponding to these locations will be associated with the charged or convicted individual's data files. Recall that the charged or convicted individual will be accompanied by a client device 140 and in some circumstances an associated monitoring band. Client device 140 will include an application program stored in memory, either permanently of temporarily, that will enable the present location confirmation system to carry out the intended functions through the client device. Once a charged or convicted individual who may be released after serving a sentence, released on bail or subject to home incarceration, if that individual is prohibited from coming within a certain distance from the dwelling place of an individual, the location confirmation system invokes geo-fencing of the relevant addresses of the victim. Subsequently, in conjunction with the client device 140 on the person of the convicted or charged individual and the monitoring band worn by that charged individual where applicable, the location confirmation system will identify when the charged/convicted individual comes within the geo-fenced victim location or within an impressible distance from such location. Once the charged/convicted individual's presence in the prohibited area is identified by the location confirmation system, the user of location confirmation system is notified and appropriate alerts may be sent and deployment of public safety officials may be ordered. In addition, the charged/convicted individual's location may be independently confirmed by pinging the individual as described above and demanding confirmation of the location and individual identity through biometric data entry as described above in connection with the home incarceration paradigm. Thus, another embodiment of the location confirmation system provides for a type of "reverse" geo-fencing where a charged/convicted individual is monitored to confirm that such person does not enter a prohibited area associated with a crime victim.

Figure 5:
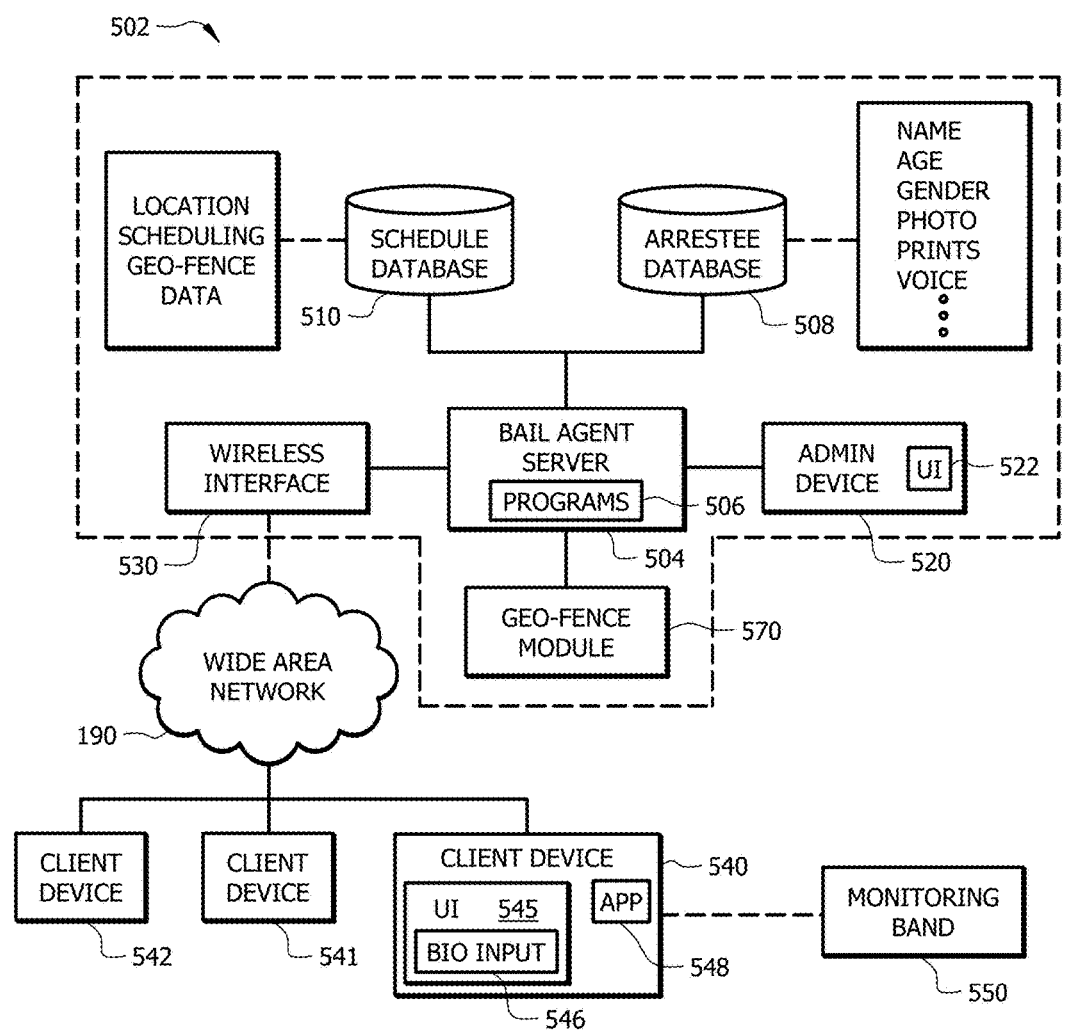
FIG. 5 is a block diagram of an embodiment of the present released arrestee location monitoring system.

The system embodying the structure and functional elements of the presently described released charged individual monitoring system is provided in FIG. 5. In FIG. 5, arrestee location confirmation platform 502 includes a bail agent server 504 including a processor 506 and associated databases including arrestee database 508, which includes individual arrestee data and scheduling database 510 including scheduling data for the particular arrestee. Ann arrestee is an individual released on bail. Arrestee data included in arrestee database 508 may include data fields associated with an individual arrestee, such as name, age, gender, photo image, fingerprints and a voice signature. Scheduling database 110 includes an address or addresses at which an arrestee is expected at various times. Most notably, scheduling database 510 includes dates and times at which the arrestee is to appear in court or otherwise in connection with the criminal charges against that person or as a condition of release on bail. It is the arrestee's presence at such scheduled events that are required in order for a bailee to not lose the security (money) pledged for the arrestee's appearance. This information in the scheduling database 510 also includes the address of the court house, government agency or other location at which the arrestee is scheduled to appear. Among the data stored in scheduling database 510 is data representing the address at which the arrestee resides or is expected to reside during the release period. The data base may also include precise latitude and longitude coordinate data representing this address.

Arrestee location confirmation platform 502 may reside remotely from client device 140 or may be a local control unit that resides locally to client device 540. Client device 540 is on the person of the arrestee and may be any several known devices that may communicate over a wide area network via various network protocols, including wireless protocols. Such devices include but are not limited to smartphones, personal digital assistants, tablets, and the like. Arrestee location confirmation platform may communicate with client device 540 via known wired or wireless protocols such as WiFi, Bluetooth or other protocols.

An administrator device 520, which may be a desktop computer, portable device, smart phone, tablet or the like, includes a user interface 522. Through this interface, the arrestee location confirmation platform 502 may communicate with and exchange information between corrections department agencies and court docketing systems in order to have updated information concerning an arrestee's scheduled court appearances. In addition, through administrator device 520 the operator of the arrestee location confirmation platform 502 may be modified and updated according to change in circumstances regarding an arrestee.

Moreover, through administrator device 520 a bailee or bail agent may monitor the status of an arrestee. This is of particular importance as a scheduled appearance of an arrestee for whom bail was posted draws near. A bail agent may log into the arrestee location confirmation platform 502 to remind an arrestee via the arrestee's client device 540 that his appearance at a scheduled hearing is approaching. Moreover, periodic reminders may be sent to an arrestee via client device 540 of a scheduled court appearance. In addition, a bail agent using the arrestee location confirmation platform may send specific messages to an arrestee by "pinging" the arrestee via the arrestee's client device 540. Communications between the arrestee location confirmation platform 502 and client device 540 may be enabled through downloading of a specially created software application 548 installed in memory of client device 540. Application 548 is a series of computer readable instructions readable by a processor of client device 540. Application 548 provides client device 540 with features and functionality to interact with arrestee location confirmation system 502 and enable arrestee location confirmation system 502 to monitor the location of an arrestee. Client device 540 may also be equipped with biometric data input means 546 such as a thumb or fingerprint sensor, a camera to record an image of the arrestee or a microphone to record the voice of an arrestee to create a voice signature of the arrestee.

Bail agent server 504 communicates with a wireless network interface 530 to communicate over a wide area network 190, which may include a wireless network, wired network or the Internet. Over network 190, the arrestee location confirmation platform 502 may communicate with a variety of client devices 540, 541 and 542 associated with each arrestee. Each client device 540, 541, and 542 includes a user interface 545 as well as a biometric data input device 546. In one embodiment, the client device is a smart phone, such as an Apple iPhone. The biometric data input device 546 of a device such as the iPhone may be the camera capability of the iPhone. In this manner, a photograph of the face of the detainee is the biometric data that is recorded and transmitted to the arrestee location confirmation platform 502. In addition or in the alternative, the client device 540 may include a fingerprint sensor such as that provided in the iPhone via its TouchID capability. Other smartphones include a camera and fingerprint sensor capability through which transactions may be executed with the phone. Software residing in mobile devices in conjunction with voice recording capability, such as an internal microphone or an external or detachable microphone, enable recording of an individual's voice and creation of a digital representation of the voice that may be stored in the arrestee database for later use in connection with the arrestee location confirmation platform. An application program 548 is installed, either temporarily or permanently on client device 50. Application program 548 facilitates communication with arrestee location confirmation platform 502 and an internal wireless interface of client device 140 allows communication with other systems and devices, including arrestee location confirmation platform 502 according to various wireless or cellular network protocols.

In one embodiment client device 540 may a combination of a monitoring band and smart phone. For arrestees released on bail that present a very low risk of flight or harm to self of community, then the above described application equipped on a smartphone or the like may be sufficient to secure the presence of an arrestee at a scheduled court appearance. For those released on bail who may be a greater risk of flight or harm, client device may include a monitoring band associated with a smartphone personal device or the like. In this embodiment, the smart phone serves as a sensor for a collocated monitoring band. An arrestee may be required to wear a monitoring band that may be independently sensed by a monitoring system adapted for a particular style of monitoring band. In the alternative, the monitoring band 550 may be equipped with an RFID or other close range tag that is sensed to be within a certain distance from a sensing device. As such, client device 540 may be further equipped via the application 548 stored in memory of the device to sense if a monitoring band uniquely associated with an arrestee is not within a certain range from client device 540. If the monitoring band is at a distance beyond an allowable range away from client device 540, arrestee location confirmation system 502 receives a notification and the operator via administrator device 520 will receive a notification that the arrestee has deviated from client device 540 beyond a permissible distance.

Monitoring band 550 as such, may be equipped with a tag, such as an RFID tag or similar tag that is sensed by a corresponding tag reader placed in close proximity to the reader. If monitoring band 550 is similar to a typical band or bracelet worn by an incarcerated individual that includes a power supply, the power supply on monitoring band 550 may include functionality that will allow recharging without removal of the band. For instance, the battery compartment of band 550 may be upward facing, which will prevent the need for removal of the band to change a battery. In addition, band 550 may include a charging port adaptable to typical smart phone type chargers that allow charging while the band is worn. In some embodiments, band 550 may not be re-used once removed as it includes a clasping mechanism that must be broken once removed. The monitoring band may be worn by the released individual around the wrist, ankle or other body part. The band operates in conjunction with a mobile device such as a smart phone equipped with an application for monitoring the location of the monitoring band in terms of its proximity to the smart phone. This is achieved in one embodiment through a control unit to which the monitoring band communicates via a wireless, short range protocol such as Bluetooth. The monitoring band includes wire of fiber optic circuitry and a closure device such as a clasp similar to that found on a watch. Once the clasp is connected to affix the monitoring band on to the incarcerated individual, the circuit of the monitoring band is completed and the associated control unit monitoring of the location of the monitoring band is invoked. The monitoring band clasp is of a non-removable design, meaning it is damaged upon removal. Of course, upon the breaking of the clasp to remove the device, the circuit is open and the control unit will detect this breach accordingly. In operation, the control unit is in communication with the monitoring band via a Bluetooth low energy transmitted and the control unit monitors the integrity of the band. In turn, the control unit communicates with the smart phone and the smart phone performs the operations of the client device 540 as described below through execution of an application installed on the smart phone. In operation, the monitoring band and smart phone will work in unison, with either the monitoring band or smart phone vibrating when a check-in or confirmation request is received from the arrestee location confirmation platform 502.

In other embodiments, the functionality of client device 540 may be incorporated into a wearable device.

In association with server 504 is geo-fencing module 570. Various geo-fencing invocation techniques are known. In one embodiment, geo-fencing module 570 establishes individual geo-fence boundaries according to the particular locations associated with locations where an arrestee is scheduled to appear as stored in database 510. By example, if an arrestee has been charged in a particular city, county or federal court, and the individual released on bail is scheduled to make appearances in that court, then once client device 540 enters a geo-fenced location corresponding to the address of the particular courthouse or other location, then arrestee location confirmation system 502 will notify a user via administrator device 520 that a released arrestee has entered the courthouse. On the other hand, in the event the arrestee has not entered the courthouse at the time the appearance was scheduled, the arrestee location confirmation system 502 notifies the bailee through the user administrator device 520. Client device 540 through the application program 548 stored thereon sends a message to arrestee location confirmation system 502 once it recognizes that it is located within the geo-fenced location of interest.

In addition, a user of the arrestee location confirmation system 502 may send regular reminders to the arrestee's client device 540 via administrator device 520 to inform the arrestee that he is due in court. In addition, the user may expressly ping client device 540 to ascertain the whereabouts of the arrestee. The arrestee may confirm his location and intent to attend the court event via message, which may be further confirmed via entry of biometric data entered via biometric input device 546 of client device 540, as discussed above in the context of those under house arrest. Ultimately, the bail agent through the use of the present arrestee location confirmation system is able to more effectively secure the presence of an arrestee released on bail at a scheduled court appearance. Moreover in the event that an arrestee fails to appear as scheduled, the arrestee location confirmation system 502 may send an alert to appropriate law enforcement and bail agent personnel or other retrieval personnel to locate the whereabouts of the arrestee and apprehend him or deliver him to the courthouse. The arrestee location confirmation system also offers the added benefit of reducing the administrative burden and reduces the amount of paperwork and expense traditionally associated with the bail process.

In addition, based on an arrestee's home address, a geo-fence setting a boundary around a dwelling at that location may be established. As described in connection with home incarceration, local tax records could be used to specifically plot a boundary or for multi-unit dwellings plot a boundary of the individual's particular dwelling unit and surrounding areas such as common areas, back yards and the like. The geo-fencing module 570 creates the boundary or an approximation of the actual property boundary based on known real estate information. The boundary so created is stored in the scheduling database 510 and is associated with the individual arrestee.

Figure 6:
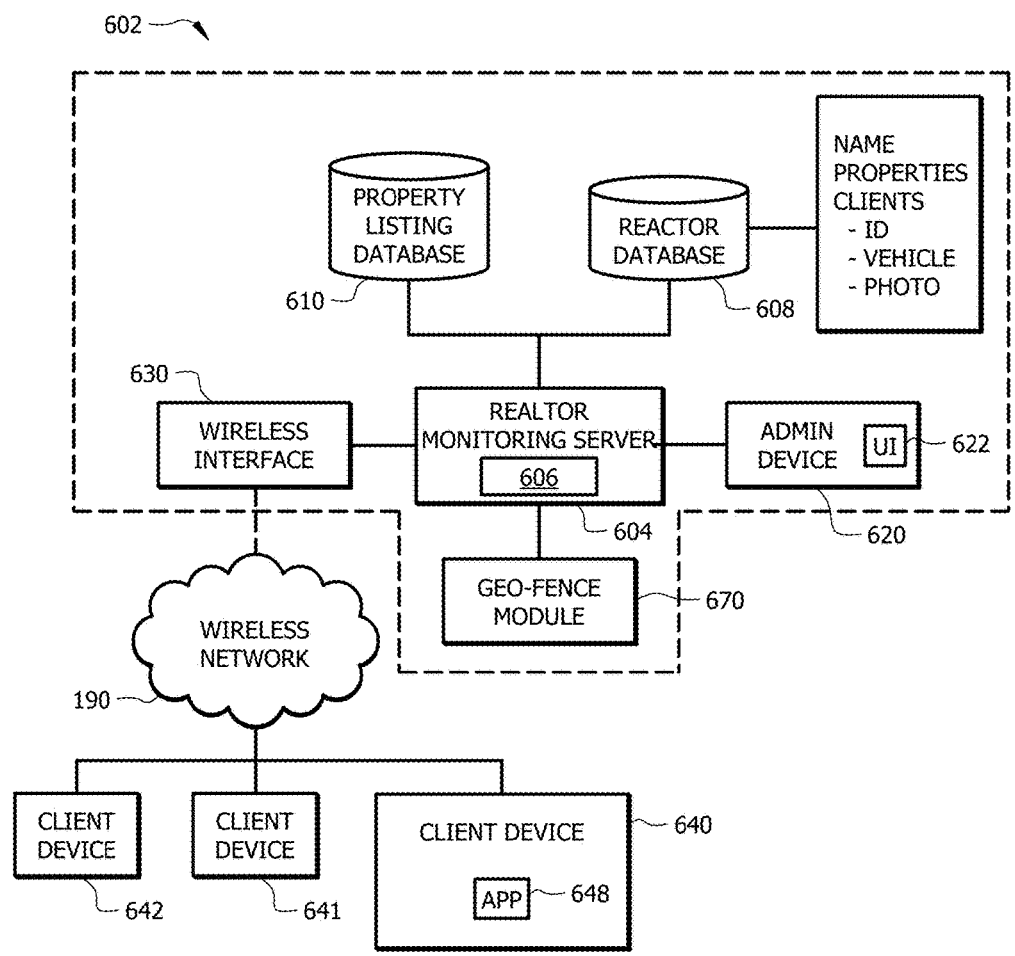
FIG. 6 is a block diagram of an embodiment of the present realtor security and listed property monitoring system.

In the alternative, installed on the detainee's client device 540 is an application program 548 having instructions executed by the processor of device 540. Through this program, a geo-fence boundary is established in proximity to the place of the dwelling of the arrestee. Depending on the size of the dwelling, a boundary of an approximate radius about a center point of the dwelling may be established. In this embodiment, the client's device 540 communicates with the geo-fencing module 570 to locate the device via GPS to designate the geo-fence. This boundary thus created is stored in the scheduling database 510 and is associated with the individual detainee. As additional locations and associated geo-fence boundaries are created for a particular individual based on authorized locations that an arrestee may visit, boundaries for these locations are created Realtor Security System The presently described systems and methods are adaptable to enhance the security and protection of realtors, potential home buyers and the residents of those listing property for sale. FIG. 6 depicts an embodiment of a realtor protection platform 602. Realtor protection platform 602 includes a realtor monitoring server 604 having a processor 606. Associated with realtor monitoring server 604 are various databases and data storage facilities. Two such databases include realtor database 608 and property listing database 610. Realtor database 608 includes information and various attributes that may be associated with a realtor. These data include the name, address and identification number of the realtor, the real estate agency with which the realtor is affiliated. Real properties for which a specific realtor or multiple realtors are considered the listing agent, and a listing of clients of the realtor. Realtor client information may include an identification number of the client, which may be a social security number of driver's license number as well as a motor vehicle identifier for the client, which may be the client's license plate number of unique vehicle identification number (VIN). Realtor database 608 may also include identification data for the client, such as a photograph.

Associated with realtor monitoring server 604 is also property listing database 610. Property listing database 610 in one embodiment includes the address and seller of a particular piece of real property for sale of lease. Property listing database 610 also includes the identification number of the realtor who is the listing agent of a particular property. Once database 610 is populated with a listing realtor, the real estate company associated with the listing realtor is also added to database 610. In addition, once a listed property address is added to database 610, server 604 causes realtor protection platform 602 to invoke the geo-fencing module 670 to create a geo-fence for each property listed in database 610.

Realtor monitoring server 604 includes a processor 606 and memory. Stored within memory, which may be remote or local, are executable program instructions that enable operations of the features and functionality of the present realtor security platform. Through population of databases 608 and 610 with data described above and the setting of parameters by the user of realtor security platform 602 via administrator device 620, a user of the platform may set various rules for monitoring properties listed by a real estate agency and one or more of its associate realtors and identifying abnormal activity that may be indicative of criminal activity.

It is contemplated that a real estate agency will operate the present realtor monitoring system, although its use is not so limited. The realtor security platform 602 described herein may be operated by law enforcement agencies, security agencies or a combination of agencies and entities, including the real estate agency. In one embodiment, the operator of the realtor security platform 602 is a home office of a real estate agency. Through the user interface 622 of administrator device 620, the home office may enroll properties and monitor traffic at those properties in real time. It is contemplated that each realtor associated with an agency will be provided with or possess a client device 640. An application program 648 dedicated to the present realtor security platform 602 will be downloaded or stored, temporarily or permanently, on each client device 640. The application program enables various functionality available to the realtor via the user interface of client device 640. By example, the realtor maintaining client device 640 may be presented with screens allowing entry of new client information and retrieval of existing client profiles. Upon entry of a new client, a new client file is created and stored in realtor database 608. Similarly, when a realtor secures a new property listing, information concerning that property may be entered via appropriate screens made available to the realtor through client device 640 and upon completion of entry of property information, property listing database 610 is updated to reflect the new listing.

A user of realtor security platform 602 may set parameters via user interface 622 to invoke warnings or an alert in the event certain conditions in associated with a property viewing are met. The application program 648 associated with client device 640 enables the presence of client device 640 within a real property for which a geo-fence has been created to be recognized. In the alternative, the application program will invoke an interface on client device 640 through which a realtor may activate a timer upon entry of a property. Application program 648 also presents the user with an interface for identifying a client with whom the realtor will be viewing a property. Note that with entry of new client information, various attributes of the client including name, address, identification number, vehicle information and a photo are stored in realtor database 608.

Prior to use of realtor security platform 602, the administrator at device 620 will set various alert parameters for realtors viewing particular properties. In one embodiment of the present realtor security platform, the user via user interface 622 will be able to ascertain the status of all properties listed by the user real estate agency and the presence of its realtors in a property and the time spent in a property. The presence and duration within a property is achieved via the application 648 residing on device 640. Through user interface 622, an administrator may be presented with a global view of agency realtors, that is, the status of all realtors viewing properties either alone or with clients may be presented. In addition, more granular presentation of a realtor's activities may be made available and monitored. Through the application 648 residing of device 640 and software executed by processor 606, a user of realtor security platform 602 may be presented with real time information of the status of a realtor and property.

A user of realtor security platform 602 via user interface 622 may also set alerts depending on a variety of factors. One such set of factors includes the duration of the realtor's showing of a property. In one embodiment, the administrator of system 602 may set multiple time values on which different indicia of the realtor's showing of the property are presented. By example, a user may monitor the status of a showing with a "red", "yellow" and "green" status system. Assuming an average home showing time for a property within a certain range of square footage is considered typical, if a realtor is with a client viewing a house of the size within the relevant range, then the status of that realtor for that showing of that property will be identified as "green" or "safe" provided the actual duration of the showing is within the predetermined acceptable range. If, however, the typical time to view the property is exceeded, the status of the viewing is reset to "yellow" or "warning". This means that the realtor's visit to the property with the client has exceeded the expected or typical time duration. Thus, the showing and realtor requires further monitoring. At this juncture, the realtor and the viewing bear watching.

Next, if a duration of a viewing reaches a value that is considered out of the ordinary, then the status of the viewing may be designated as "red" of "danger". At this point, since the viewing of the property is far longer than what is typical or even reasonably longer than what is typical, the realtor may be deemed to be in danger. Once a viewing is designated as "red", the realtor security platform may send an alert to local law enforcement, prompting deployment of appropriate public safety personnel to the address of the home being viewed. During the status setting and monitoring phases of operation of the realtor security platform 602, the status of several realtors out in the field are presented to the user via user interface 622 and the status of each realtor and his or her respective showing is presented to the user according to the color coded convention described above or other appropriate nomenclature to make the status of the realtors and property easily identified by the operator. In another embodiment of the realtor security platform 602, once the status of a showing, property or realtor is "yellow" or "warning", the profile of the client or clients who accompanied the realtor to the subject property is retrieved by realtor monitoring server 604 and presented to user 620. This will allow the operator of the system back at the home office or elsewhere to have at his disposal the contact and identifying information concerning the client. On the other hand, presentation of the client's profile may prompt the user at administrative device 620 to override the warning system if it becomes evident to the user that the client accompanying the realtor to the subject property is a known or trusted client, making activation of the warning system unnecessary.

In parallel with the warning nomenclature displayed to the user via interface 622, the realtor security platform will also send a message or alert to the realtor directly. Depending on the circumstances of the showing, the realtor may invoke an override function from the client device 140 to prevent escalation of the hazard relating setting and ultimate reporting of the showing. Through the described realtor security platform, the status of all realtors and properties of a real estate agency is readily available to the realtor's home office and any criminal activity associated or direct towards the realtor or the property so listed by the agency may be averted by prompt notification to the relevant authorities of an atypical showing of a property.

An administrator device 620 with user interface 622 is associated with realtor monitoring server 604. Through administrator device 620 a user of the realtor protection platform may update information concerning a realtor or property of various parameters concerning operation of the realtor protection platform as will be discussed. Administrator device 620 may be a wireless device such as a smartphone or desktop computer, laptop computer, tablet, personal digital assistant or the like. Also associated with realtor monitoring server 604 is a wireless interface 630 that enables realtor security platform 602 to be in communication via a wide area network which may be a wireless network 190 to one or more client devices 640, 641 and 642. Client device 640 may be smartphone, laptop computer, tablet, personal digital assistant or the like. An application program 648 is installed, either temporarily or permanently on each client device 640. Application program 648 facilitates communication between a realtor equipped with client device 640 and the operator of the realtor security platform 602. An internal wireless interface of client device 640 allows communication with other systems and devices, including realtor security platform 602 according to various wireless or cellular network protocols.

Unlicensed Motorist Identification System.

Employing similar system architecture as described above, an unlicensed motorist identification system may be incorporated as additional functionality into systems described above relating to home incarceration or arrestee location confirmation and monitoring. Leveraging municipal or local court or public safety records, a database including data associated with individuals cited for traffic violations due to operating a vehicle without a valid operator's license may be stored. Once an individual is identified as one who has been cited for such a violation, an aspect of the penalty for such a violation may be the user accepting a download of a tracking application to a client device, such as a smartphone or the like. Software residing on or in association with the servers described above may allow an administrator of the location tracking platform to view, via a user interface, the location of those individuals cited for the subject violation when it may be determined via GPS data or the like that the subject individual's client device is moving at a rate of speed that would be indicative of traveling in a motor vehicle. A photograph or other identification data may be stored in an unlicensed driver database associated with the server. While department of public safety personnel may not be inclined to act on the location of any such individual, when a public safety vehicle is in close proximity to the vehicle believed to be occupied by the previously unlicensed motorist, then the location platform may so inform the public safety vehicle of the identity and photograph of the previously cited driver. If readily apparent, the public safety officer may determine if the previously cited driver is once again operating a vehicle, or if that person is only a passenger. Note that once one previously cited for operating a vehicle without a valid license is issued a valid license, then that person's file may be removed from the unlicensed drive database, or flagged as an archived/inactive file. The unlicensed vehicle tracking system, therefore, aids public safety personnel in preventing unlicensed motorists from operating vehicles. The presently described unlicensed motorist identification system may be a module associated with the home detainee location monitoring system of arrestee location confirmation system described above or may be a standalone system.

Figure 7:
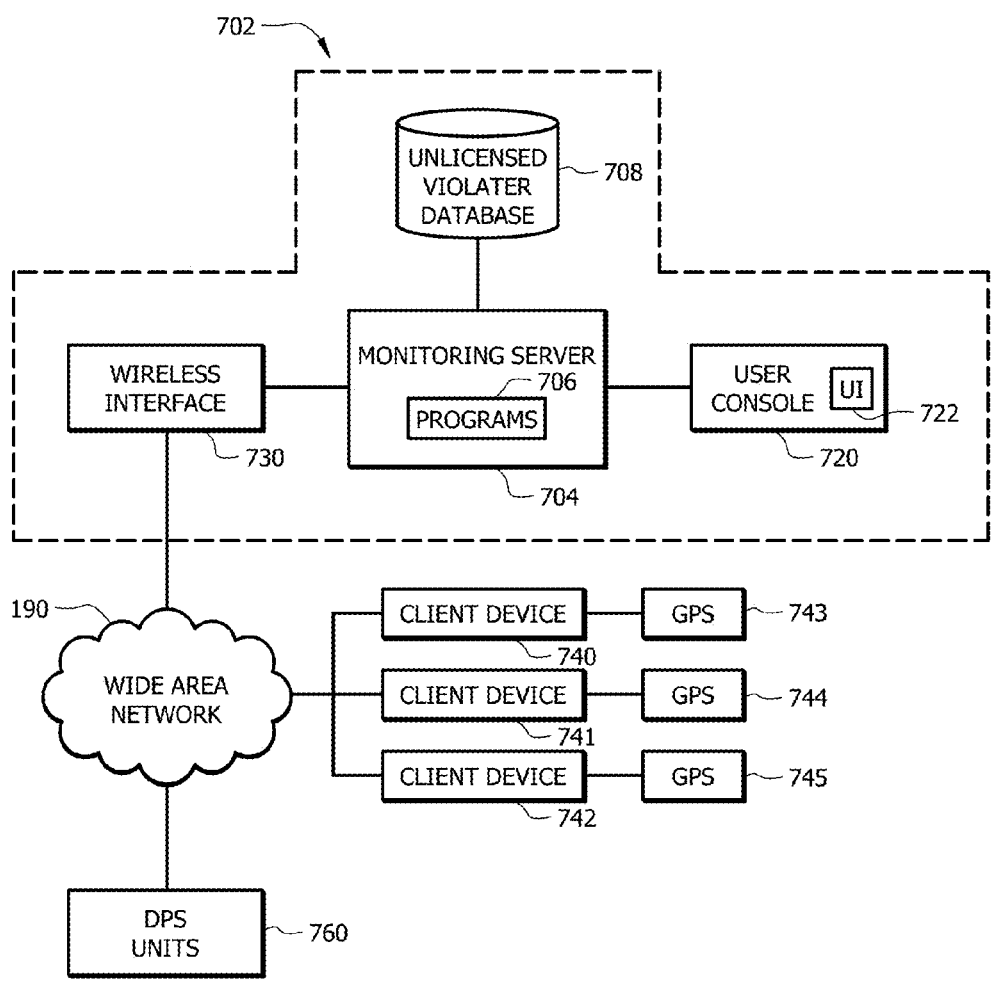
FIG. 7 is a block diagram of an embodiment of the present unlicensed motorist tracking system.

One embodiment of the components of the present unlicensed motorist identification system are provided in FIG. 7. In FIG. 7, unlicensed motorist identification system 702 includes a monitoring server 704 having a processor and various executable application programs 706 that carry out the features and functionality of the presently described unlicensed motorist identification system. Associated with server 704 is a user console 720 having a user interface 722. As described above, user console may be a smartphone, laptop or desktop computer, personal digital assistant, and the like that enable wired or wireless communication with the server or external devices via various network protocols. Unlicensed violator database 708 associated with server 704 contains data associated with individuals previously receiving citations for operating a vehicle without a valid license. Wireless interface 730 permits the monitoring server to communicate with other devices over a wide area network 190 which may be a wireless network, private network or the Internet. Various department of public safety (DPS) units 760 receive communications from unlicensed motorist identification system 702 via network 190. Client devices 740, 741 and 742, which may be enabled with GPS functionality 743, 744 and 745, respectively. Those previously cited for unlicensed operator violations may be required to download an unlicensed motorist identification system application that will enable unlicensed motorist identification system 702 to monitor the location of a previously cited individual when unlicensed motorist identification system 702 senses that client device 740 is traveling above a specified rate of speed, indicating likely travel by motor vehicle. Software programs 706 executed by the processor of server 704 operates in conjunction with the GPS data received by the client devices over network 190 to provide DPS units 760 the location of an individual whose previous violation is stored in database 708. Similar capability to the unlicensed motorist identification system 702 may be employed to track the location of various vehicles that comprise a fleet. Each vehicle and operator may be identified and such tracking data may be stored in a database. The vehicle or driver, or both, may be provided with a device such as the client device that allows a location system to track the location of the vehicle. Alerts may be provided and appropriate personnel notified in the event a vehicle is outside of an authorized location.

Figure 8:
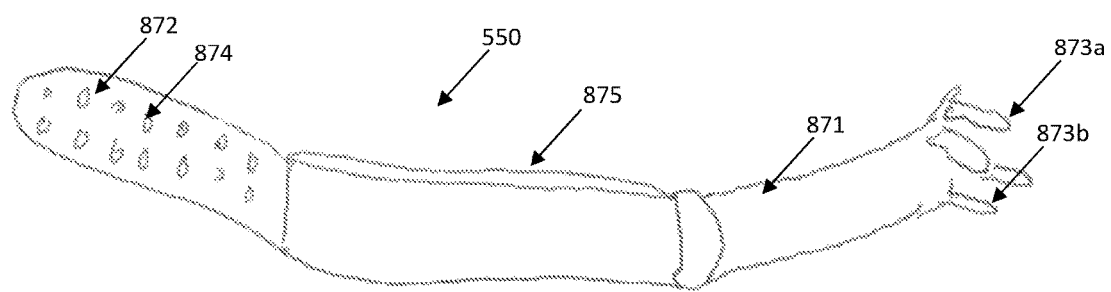
FIG. 8 is a perspective view of a monitoring band in one embodiment.

As noted, in some embodiments the system utilizes a monitoring band 550. In one embodiment the monitoring band 550 communicates with a client device, such as a smart phone. In one embodiment the monitoring band 550 communicates wirelessly. FIG. 8 is a perspective view of a monitoring band 550 in one embodiment. As depicted, the monitoring band 550 comprises a bracelet which is worn on the user's hand. The monitoring band 550 couples and secures to a user's hand via any method known in the art. In one embodiment, discussed below, the monitoring band 550 fastens as a traditional watch. This is for illustrative purposes only and should not be deemed limiting.

As depicted the monitoring band 550 comprises an inner wrap 871 and an outer wrap 872. The inner wrap 871 is the portion of the band which is adjacent to the user's hand when secured. At least a portion of the outer wrap 872 rests above the inner wrap 871.

As depicted, the outer wrap 872 comprises at least two holes 874 which will receive the prongs 873 located on the inner wrap 871. As depicted, there are a plurality of holes 874 spread lengthwise along the outer wrap 872. Having a plurality of holes 874 allows the band 550 to be snugly fitted and adjusted to fit various hand sizes. In operation, the prongs 873 are inserted into the holes 874 which securely couples the inner wrap 871 to the outer wrap 872. As will be discussed in more detail, in one embodiment, this coupling allows for the closing of the circuit, which allows the determination of whether the monitoring band 550 is ever removed.

As discussed, the inner wrap 871 comprises at least two prongs 873. As depicted, the inner wrap 871 comprises four prongs 873. In one embodiment, the inner wrap 871 comprises at least one upstream prong 873b and one downstream prong 873a. Upstream and downstream refer to relative locations along the band 550. Upstream refers to a position closer to the center computing portion 875, whereas downstream refers to a location further from said computing portion 875.

A prong 873, as used herein, refers to any conductive material which extends beyond the planar face of the inner wrap 871. The prongs 873 can comprise cylindrical rods as depicted, but this is for illustrative purposes only and should not be deemed limiting. The prongs 873 can be long or short, thin or thick, comprise a small diameter or a large diameter. In one embodiment the prongs 873 are conductive and provide a method in which the inner wrap 871 can couple to the outer wrap 872.

Figure 9:
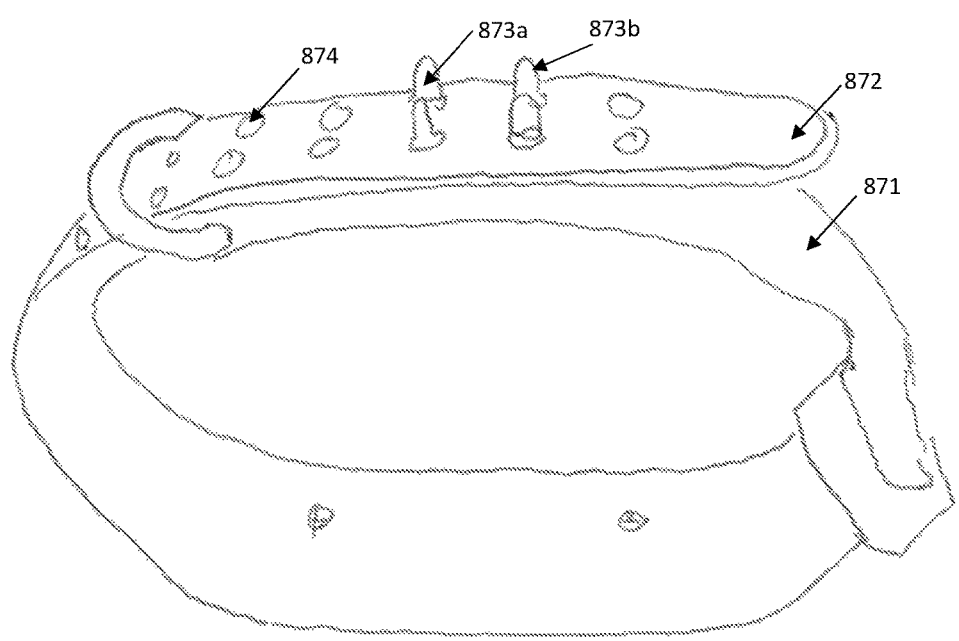
FIG. 9 is a second perspective view of a monitoring band in one embodiment.

Turning now to FIG. 9, FIG. 9 is a second perspective view of a monitoring band in one embodiment. The band 550 depicted in FIG. 9 comprises an outer wrap 872 coupled to the inner wrap 871. As can be seen, at least a portion of the outer wrap 872 is resting atop the inner wrap 871. Further, the prongs 873 are shown extending through the holes 874, securely coupling the outer wrap 872 to the inner wrap 871. As will be discussed in more detail below, in one embodiment the inner wrap 871 and the outer wrap 872 each comprise an internal conducting band. In one embodiment, the prongs 873 are electrically coupled to the internal conducting band located on the inner band 871. Additionally, in one embodiment, when the prongs 873 are inserted into the holes 874, the prongs 873 become electrically coupled to the internal conducting band located on the outer band 872.

Figure 10:
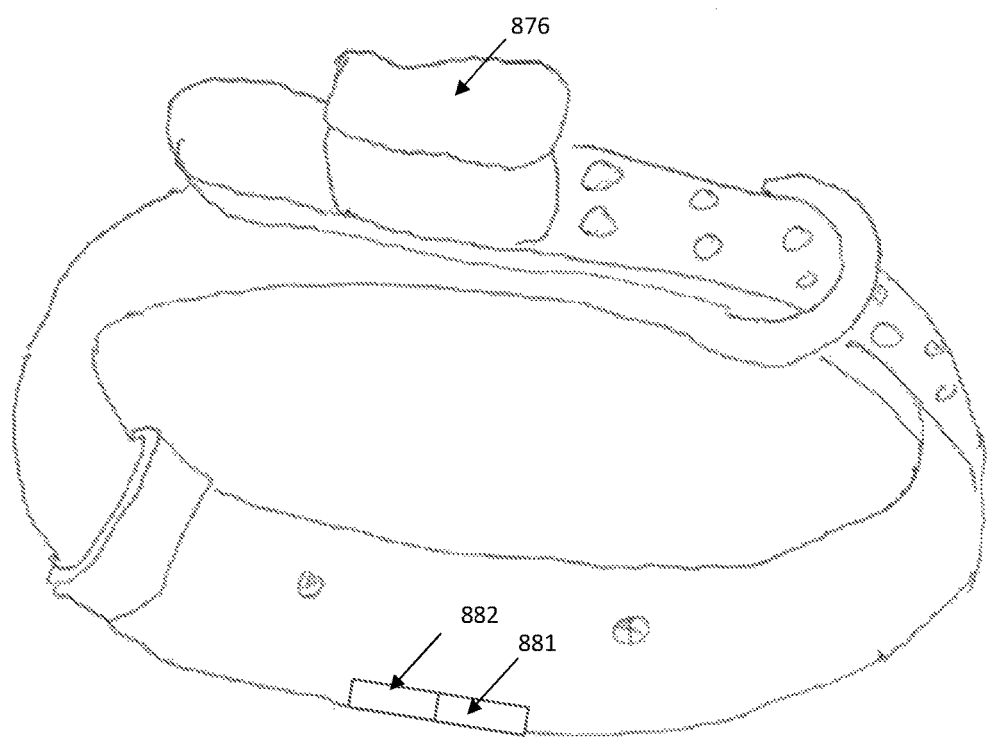
FIG. 10 is a perspective view of a monitoring band with a cap in one embodiment.

Now turning to FIG. 10, FIG. 10 is a perspective view of a monitoring band with a cap in one embodiment. The cap 876, in one embodiment has a non-conductive outer surface. The bottom face of the cap 876 has holes which mate with the tops of the prongs 873. Thus, the top portion of the prongs 873 are received by the holes on the cap 876.

In one embodiment the cap 876 comprises an internal conductive surface. In one embodiment the internal conductive surface comprises a conductive plate. When at least one upstream prong 873b and one downstream prong 873a are inserted into the cap 876, the internal conductive surface closes the circuit and allows electricity to flow from the upstream prong 873b, through the internal conducting surface of the cap, through the downstream prong 873a, through the internal conducting band of the outer wrap 872 and back to the computing portion 875. Thus, in one embodiment, the cap 876 allows for a closed circuit. If the cap 876 is removed, or the band 550 otherwise removed, the closed circuit is open, and the computing portion 875, or other parts of the system, will record that the circuit was open, indicating that the user was not wearing the band 550.

Figure 11:
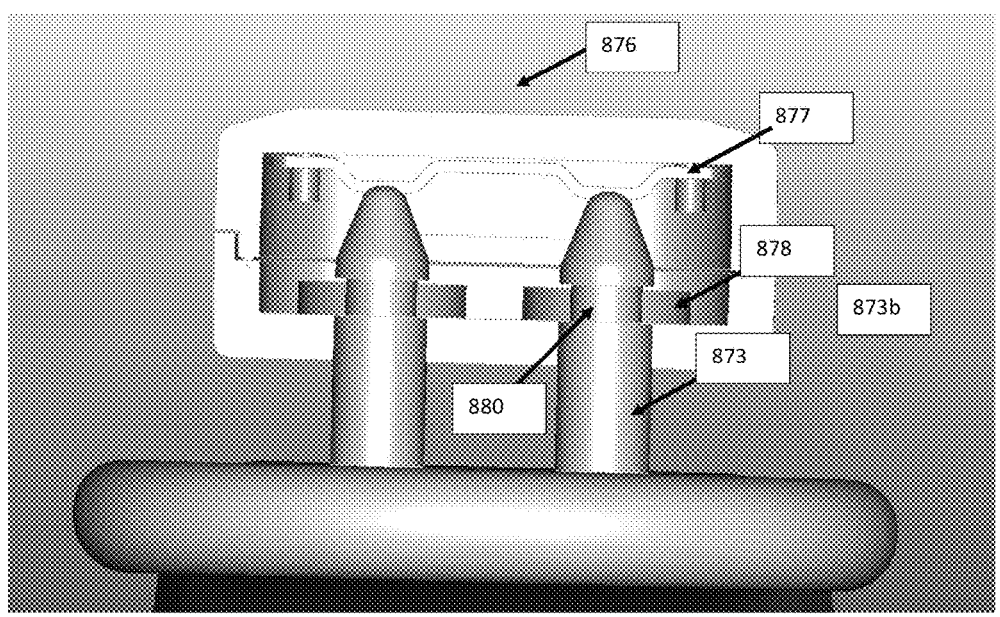
FIG. 11 is a side schematic view of the cap circuit in one embodiment.

FIG. 11 is a side schematic view of the cap circuit in one embodiment. As can be seen, the cap 876 comprises an internal conductive surface 877. The internal conductive surface 877 can comprise any conductive material.

The cap 876, in one embodiment, further comprises a cap coupler 876. A cap coupler 876 couples the cap to the prongs 873. As depicted, in one embodiment the prongs 873 comprise a prong recess 880 which is an area of reduced diameter. In one embodiment the cap coupler 876 is sized so as to fit within the prong recess 880. In one embodiment the cap coupler 876 comprises a C-shaped coupler which mates with each prong. The C-shape allows the coupler to bend and open in order to receive the prong 873. Thereafter, once the C-shape of the coupler meets the prong recess 880, the coupler snaps back securely against the recess. In one embodiment, the top portion of the prong 873 comprises a greater diameter as compared to the prong recess 880. This increased diameter prevents the coupler 876 from being easily dislodged.

In one embodiment the cap 876 comprises a one-time fit cap 876. A one-time fit cap, as used herein, refers to a cap 876 which functions as intended when coupled to the prongs 873, but becomes inoperable once removed. In one such embodiment, the couplers 878 break upon removal. Such breakage provides physical evidence that the user has not been wearing the monitoring band 550 as required. It prevents the user from removing the monitoring band 550 without consequence.

Figure 12:
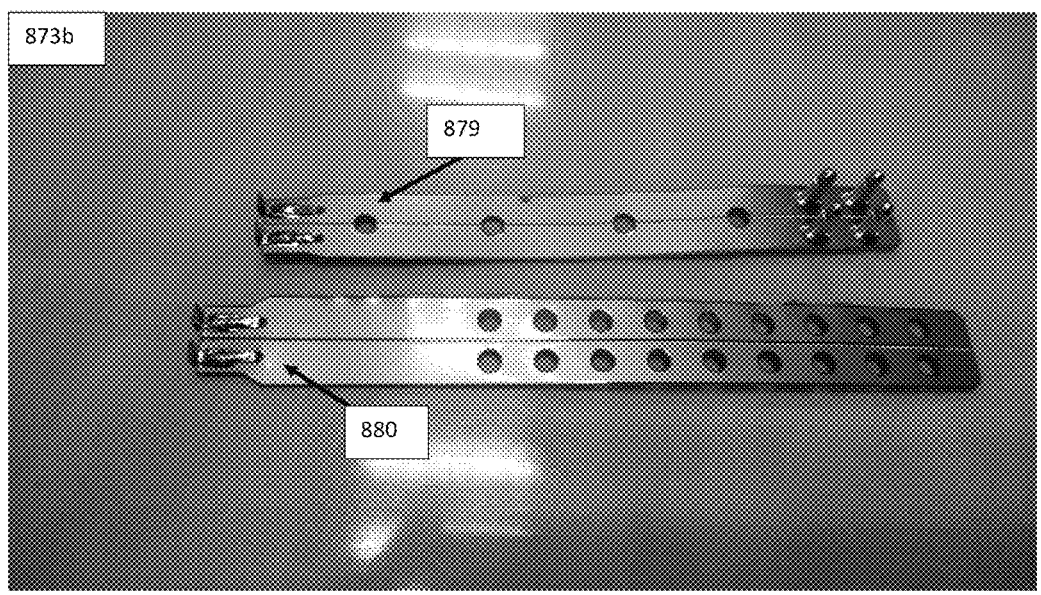
FIG. 12 is view of the internal wire band in one embodiment.

FIG. 12 is view of the internal wire band in one embodiment. FIG. 12 depicts the internal conducting band 879 of the inner wrap 871 as well as the internal conducting band 880 of the outer wrap 872. The internal conducting bands can comprise any conductive material. They can comprise a band, as depicted, or a wire.

As noted, in one embodiment the inner wrap 871 and the outer wrap 872 each comprise a non-conductive external surface. They can be coated with a plastic, rubber, silicone, etc. which will not conduct electricity. They each further comprise an internal conducting band 879, 880. Accordingly, when the cap 876 electrically connects the upstream and downstream prongs, the internal conducting bands complete the circuit and allow a current to flow from the computing portion 875, through the inner wrap 871 and outer wrap 872, and back to the computing portion 875. In one embodiment the internal conducting bands 879, 880 are flexible such that they can bend within their respective wraps around a user's hands.

In one embodiment the internal conducting band 879 extends only to the first upstream prong and does not extend to the downstream prong. In such an embodiment, the only way to electrically connect the circuit is through the cap which electrically connects the upstream prong with the downstream prong.

While one embodiment has been described using an inner and outer wrap, this is for illustrative purposes only and should not be deemed liming. The two bands extending from the computing portion 875 can be coupled in any fashion such that when coupled they close the electrical circuit. In one embodiment, as noted, they are closed with a cap, or other similar feature, which electrically couples the two bands to complete the circuit. In one embodiment, for example, rather than the outer wrap 872 laying atop the inner wrap 871, the two are joined at the ends. One skilled in the art, armed with the instant disclosure, will understand the various methods and devices which can be used to electrically couple two bands extending in opposite directions from a central computing portion 875.

The central computing portion 875 can comprise the various features described herein. In one embodiment the computing portion 875 comprises the necessary hardware and/or software to communicate with the user's device, such as a smart phone. Further, in one embodiment the computing portion 875 comprises a power source, such as a battery, which provides the power necessary to both communicate with the user's device, as well as provide a current to ensure and monitor that the monitoring band 550 is being worn at all required times.

In one embodiment the power source provides sufficient power for at least one month between charges. This is a significant advantage in that the user is not required to charge the battery every day, as is required for some batteries for certain device. Further, in one embodiment, the battery can be fully charged in 15 minutes. This too is an advantage is it provides the user flexibility and does not require them to sit and charge daily.

Turning briefly back to FIG. 10, FIG. 10 illustrates the charging features in one embodiment. As depicted, the band 550 comprises a charging port 882 which is electrically coupled to a charging wire when the battery is being recharged. Current flows through the charging port 882 as is common with other devices. The charging port 882 can comprise any suitable port which allows a battery to be recharged. This includes, but is not limited to, a USB port, and other AC/DC chargers.

In one embodiment, and as depicted, the band 550 further comprises a charging stabilizer 881. A charging stabilizer 881 is a device which holds and secures the charging wire in its desired location during charging. The stabilizer 881 can comprise a lock, a spring, etc. which secures to the charging device. In one embodiment the stabilizer comprises magnets. These magnets couple with mating magnets located on the charging device. The magnets hold the charging device in the desired location relative to the charging port 882 and prevents the charging device from becoming undesirably dislodged, disrupting the charging.

The monitoring band 550 can have many of the features described above. In one embodiment the monitoring band 550 further has features related to fitness such as a heart rate monitor, a step counter, a distance calculator, a timer, etc. Virtually any capability found on traditional fitness watches can be incorporated into the monitoring band 550.

In one embodiment the monitoring band 550 further comprises a heart rate and a body thermometer, or equivalent, which can determine the user's body temperature. Such data can be used to help determine if a user is under the influence of drugs or alcohol. As an example, if a user's heart rate and temperature are typically at a specified rate, and then there is a spike in heart rate and temperature for a four hour period, this can be indicative that the user is under the influence of drugs. Thus, this data can be used to further monitor the user.

In one embodiment the monitoring band 550 further comprises a breath analyzer capability. In such embodiments, the user must breathe into the monitoring band 550 so the user's breath can be tested for the presence of alcohol or other substance.

As noted, the band 550 described above has several advantages. First, it provides a method of ensuring that the band 550 is not removed without detection. If the user removes the band 550, the removal will be recorded and ultimately reported. Second, the band 550, in one embodiment, is considerably less expensive than the prior art ankle bracelets. Third, the band 550, in some embodiments, resembles fitness bracelets and bands common worn by the general public. As such, the stigma of wearing a monitoring band 550 is lessened. Fourth, as noted in some embodiments a single charge of the battery will last for more than one month. This reduces the necessity for the user to constantly charge the battery.

Figure 13:
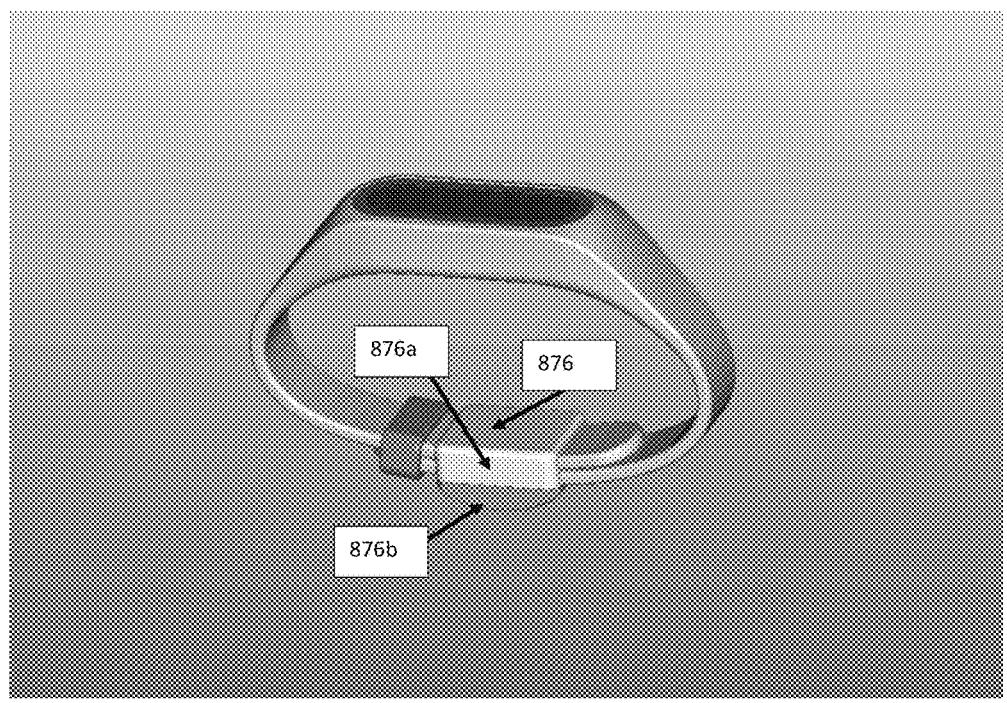
FIG. 13 is a perspective of the band in a further embodiment.

FIG. 13 is a perspective of the band in a further embodiment. As depicted the cap 876 comprises two portions: an upper cap portion 876*a* and a lower cap portion 876*b*. The cap 876 can function as discussed previously. However, in the embodiment depicted in FIG. 13 a lower cap portion 876*b* connects and couples to the upper cap portion 876*a*. In so doing, the two cap portions 876*a, b* sandwich together both bands within a cap. This is contrasted to the cap 876 of FIG. 10 wherein the cap rested only upon the outer wrap. In FIG. 13, however, the cap 876 surrounds and couples both the inner and outer wraps. This has several benefits. First, it provides an additional opportunity to further couple and connect the two wraps. This reduces the likelihood of an accidental decoupling.

Second, a cap portion which sandwiches the inner and outer wrap provides structural integrity to the prongs. The prongs are now fully encompassed within the caps, reducing the likelihood that one will become damaged, dislodged, etc.

Figure 14:
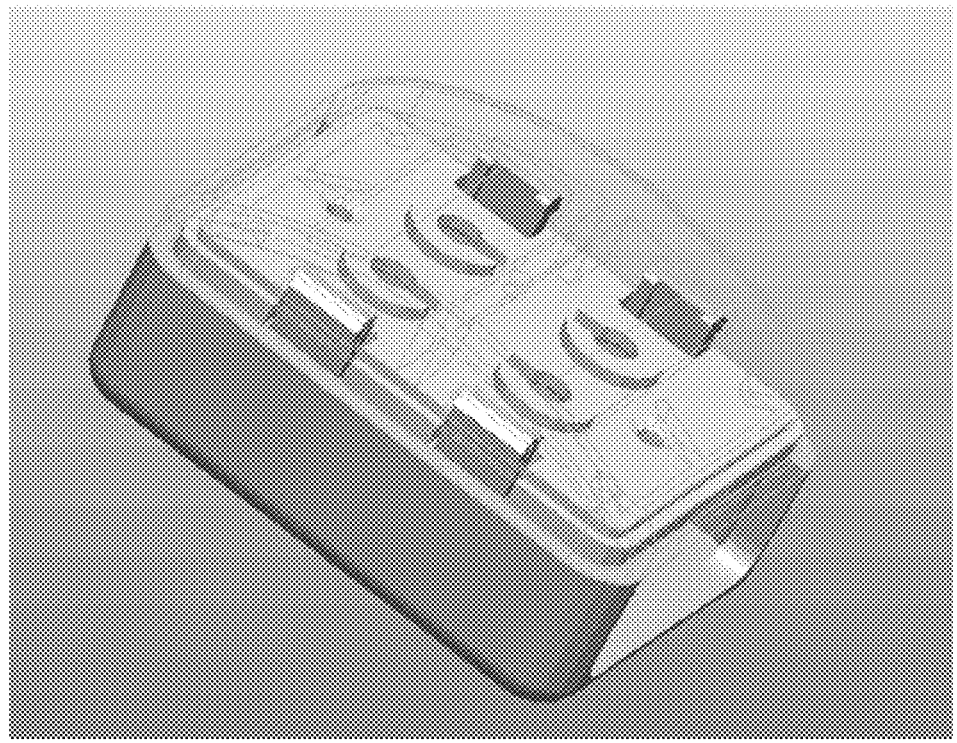
FIG. 14 is a perspective view of the cap in one embodiment.

FIG. 14 is a perspective view of the cap in one embodiment. The upper portion 876*a* is depicted, with the lower portion 876*b* shown in hidden lines. The cap 876 can function as previously described. As can be seen, the inner and outer wraps will be coupled at the upper portion 876*a*, and then the lower portion 876*b* will couple with the upper portion 876*a* so as to sandwich the inner and outer wraps.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious various thereof is contemplated as falling within the spirit and scope of the disclosed inventions.

I claim:

1. A wearable band comprising:
   a computing portion coupled and located between an inner wrap and an outer wrap;
   at least two holes located in said outer wrap;
   at least one downstream prong and at least one upstream prong located on said inner wrap;
   wherein said inner wrap comprises an internal conducting band;
   wherein said outer wrap comprises an internal conducting band;
   wherein said inner wrap and said outer wrap comprise a non-conductive outer coating;
   a cap which couples to at least two prongs, wherein said cap electrically couples said at least two prongs; wherein when said prongs on said inner wrap are inserted through said holes in the outer wrap, and when said cap electrically couples at least one upstream prong with at least one downstream prong, a complete electrical circuit is completed, but if the cap is removed, the circuit is stopped; wherein said computing portion can communicate with a mobile device, and wherein said mobile device can determine if the electrical circuit on said band is broken, and wherein said mobile device captures physical characteristic data at said device.

2. The wearable band of claim 1 wherein said cap comprises an internal conductive surface which electrically couples at least one upstream prong and at least one downstream prong, and wherein said cap comprises couplers which couple and connect with said prongs.

3. The wearable band of claim 2 wherein said prongs comprise a prong recess, wherein said prong recess has a smaller diameter than a top portion of said prong, and wherein said couplers on said cap couple with said prongs at said prong recess.

4. The wearable band of claim 2 wherein said coupler comprises a C-shaped coupled which mates with the recess of each prong.

5. The wearable band of claim 4 wherein said at least one downstream prong comprises two downstream prongs, and wherein said at least one upstream prong comprises two upstream prongs, and wherein said couplers breaks upon removal.

6. The wearable band of claim 1 wherein said cap comprises a one-time fit cap.

7. The wearable band of claim 1 wherein said cap comprises an upper portion and a lower portion, and wherein said cap sandwiches said inner and outer wraps.

8. The wearable band of claim 1 wherein said internal conducting band on said inner wrap does not extend to said at least one downstream prong, and wherein the only way to complete a circuit is through said cap which electrically connects said at least one upstream prong with said at least one downstream prong.

9. The wearable band of claim 8 wherein said mobile device can determine if the electrical circuit on said band is broken.

10. The wearable band of claim 1 wherein when said cap is broken, the circuit is open and the mobile device unit will detect this breach, and wherein said mobile device will communicate the breach to a remote server.

11. The wearable band of claim 1 further comprising a close range tag.

12. The wearable band of claim 1 further comprising a breath analyzer.

13. The wearable band of claim 1 further comprising a heart monitor.

14. A system for confirming the location of an incarcerated individual, comprising
   a mobile device,
   a global positioning system receiver, a microprocessor and a wireless communication transceiver coupled to the global positioning system receiver;
   a user interface, comprising a display and a physical characteristic input for recording an attribute of the incarcerated individual; and
   a storage medium,
   wherein the mobile device is programmed to send device location and physical characteristic data to a remote system and receive a request for the mobile device location confirmation, and wherein said mobile device captures said physical characteristic data at said device,
   a wearable article in communication with the mobile device, wherein the wearable article comprises a cap which completes an electrical circuit when connected;
   wherein said wearable article comprises:
      a computing portion coupled and located between an inner wrap and an outer wrap;
      at least two holes located in said outer wrap;
      at least one downstream prong and at least one upstream prong located on said inner wrap;
      wherein said inner wrap comprises an internal conducting band;
      wherein said outer wrap comprises an internal conducting band;
      wherein said inner wrap and said outer wrap comprise a non-conductive outer coating;

wherein when said cap is coupled to said at least two prongs an electrical circuit is closed and wherein when said cap is removed the electrical circuit is open.

15. The system of claim 14 wherein said internal conducting band on said inner wrap does not extend to said at least one downstream prong, and wherein the only way to complete a circuit is through said cap which electrically connects said at least one upstream prong with said at least one downstream prong.

16. The system of claim 14, wherein the physical characteristic input is a fingerprint sensor for recording a fingerprint of the incarcerated individual.

17. The system of claim 14 wherein when said cap is broken, the circuit is open and the mobile device unit will detect this breach, and wherein said mobile device will communicate the breach to a remote server.

18. The system of claim 14 further comprising a breath analyzer.

19. The system of claim 14 wherein said cap comprises an internal conductive surface which electrically couples at least one upstream prong and at least one downstream prong, and wherein said cap comprises couplers which couple and connect with said prongs, and wherein said prongs comprise a prong recess, wherein said prong recess has a smaller diameter than a top portion of said prong, and wherein said couplers on said cap couple with said prongs at said prong recess.

\* \* \* \* \*